(12) United States Patent
Park

(10) Patent No.: US 8,868,248 B2
(45) Date of Patent: Oct. 21, 2014

(54) SMART CONTROL DEVICE

(75) Inventor: Jong Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 13/094,305

(22) Filed: Apr. 26, 2011

(65) Prior Publication Data

US 2011/0264286 A1 Oct. 27, 2011

(30) Foreign Application Priority Data

Apr. 27, 2010 (KR) ........................ 10-2010-0038957

(51) Int. Cl.
| | | |
|---|---|---|
| *H04L 12/12* | (2006.01) | |
| *H04L 12/28* | (2006.01) | |
| *G06Q 10/00* | (2012.01) | |
| *G06Q 50/06* | (2012.01) | |
| *H02J 9/00* | (2006.01) | |
| *H02J 3/14* | (2006.01) | |

(52) U.S. Cl.
CPC ............ *H04L 12/282* (2013.01); *H02J 9/005* (2013.01); *Y04S 20/222* (2013.01); *Y04S 20/228* (2013.01); *Y02B 70/3266* (2013.01); *Y02B 60/32* (2013.01); *Y02B 70/3225* (2013.01); *G06Q 10/00* (2013.01); *Y02B 70/3233* (2013.01); *G06Q 50/06* (2013.01); *H02J 2003/143* (2013.01); *Y02B 60/34* (2013.01); *H02J 3/14* (2013.01); *Y04S 20/225* (2013.01); *Y04S 20/242* (2013.01); *Y02B 70/325* (2013.01); *H04L 2012/285* (2013.01); *H04L 12/12* (2013.01)
USPC ............. 700/295; 700/286; 700/67; 700/296; 700/291; 700/297

(58) Field of Classification Search
None
See application file for complete search history.

(56) References Cited

U.S. PATENT DOCUMENTS

| | | | | |
|---|---|---|---|---|
| 7,010,363 | B2* | 3/2006 | Donnelly et al. | 700/19 |
| 7,110,832 | B2* | 9/2006 | Ghent | 700/16 |
| 7,266,962 | B2* | 9/2007 | Montuoro et al. | 62/236 |
| 8,068,938 | B2* | 11/2011 | Fujita | 700/295 |
| 8,099,195 | B2* | 1/2012 | Imes et al. | 700/278 |
| 8,204,633 | B2* | 6/2012 | Harbin et al. | 700/295 |
| 8,315,717 | B2* | 11/2012 | Forbes et al. | 700/22 |
| 8,355,826 | B2* | 1/2013 | Watson et al. | 700/291 |
| 8,369,998 | B2* | 2/2013 | Drake et al. | 700/295 |
| 2003/0233201 | A1* | 12/2003 | Horst et al. | 702/62 |
| 2004/0117330 | A1* | 6/2004 | Ehlers et al. | 705/412 |
| 2009/0094173 | A1* | 4/2009 | Smith et al. | 705/412 |
| 2009/0326726 | A1* | 12/2009 | Ippolito et al. | 700/291 |
| 2010/0070099 | A1* | 3/2010 | Watson et al. | 700/295 |
| 2010/0088261 | A1* | 4/2010 | Montalvo | 706/15 |

(Continued)

*Primary Examiner* — Kavita Padmanabhan
*Assistant Examiner* — Christopher E Everett
(74) *Attorney, Agent, or Firm* — Birch, Stewart, Kolasch & Birch, LLP

(57) ABSTRACT

A smart control device is disclosed. The smart control device can be equipped in an electrical appliance, so as to be capable of controlling the electrical appliance by using diverse information that is provided from both the inside and the outside of the electrical appliance. In a smart control device monitoring and scheduling operations of an electrical appliance, the smart control device includes an interface unit configured to receive energy information, a smart controller configured to control energy saving functions of the electrical appliance based upon the energy information received from the interface unit, and an input unit configured to receive an inputted control command respective to the electrical appliance. Herein, the smart controller may be provided in the electrical appliance, and the smart controller may control the electrical appliance so that the electrical appliance can be operated in an energy saving operation mode based upon the received energy information.

17 Claims, 17 Drawing Sheets

(56) References Cited

U.S. PATENT DOCUMENTS

| | | | |
|---|---|---|---|
| 2010/0101254 A1* | 4/2010 | Besore et al. | 62/264 |
| 2010/0121499 A1* | 5/2010 | Besore et al. | 700/295 |
| 2010/0161148 A1* | 6/2010 | Forbes et al. | 700/295 |
| 2010/0207728 A1* | 8/2010 | Roscoe et al. | 340/10.1 |
| 2010/0211233 A1* | 8/2010 | Roscoe et al. | 700/296 |
| 2011/0016200 A1* | 1/2011 | Koch | 709/220 |
| 2011/0066300 A1* | 3/2011 | Tyagi et al. | 700/291 |
| 2011/0153101 A1* | 6/2011 | Thomas et al. | 700/291 |
| 2011/0153110 A1* | 6/2011 | Drake et al. | 700/296 |
| 2011/0202194 A1* | 8/2011 | Kobraei et al. | 700/295 |
| 2012/0022709 A1* | 1/2012 | Taylor | 700/295 |
| 2012/0209442 A1* | 8/2012 | Ree | 700/295 |

* cited by examiner

SMART CONTROL DEVICE

Pursuant to 35 U.S.C. §119(a), this application claims the benefit of the Korean Patent Application No. 10-2010-0038957, filed on Apr. 27, 2010, which is hereby incorporated by reference as if fully set forth herein.

BACKGROUND OF THE INVENTION

1. Field of the Invention

The present invention relates to a smart control device and, more particularly, to a smart control device that is provided in electrical devices (or appliances). Herein, the smart control device can receive and transmit diverse information that are provided inside or outside of the corresponding electrical device, and the smart control device can also control the corresponding electrical device based upon the received and/or transmitted information.

2. Discussion of the Related Art

Energy (or power) that is used to operate electrical appliances that are used in households and office equipments that are used in offices is generally provided in the order of a power generator, which is operated and managed by the Korea Electrical Power Corporation (KEPCO), a transmission line, and a distribution line.

The power supplied by KEPCO has the characteristics of a central power and not a distributed power. Such power (or energy) is provided in a radial structure, which allows electricity to be distributed from the center to its surroundings. Furthermore, instead of being consumer based, such electrical power corresponds to a supplier based one-way electrical power.

Additionally, the technology basis either corresponds to an analog basis or corresponds to an electro-mechanical basis. And, in case of a malfunction, recovery should be performed manually, and the installation should also be recovered manually.

Information on the electricity price was available with limitation only through the Korea Power Exchange, instead of being available in real-time. Furthermore, since the pricing system was actually a fixed pricing system, there was a problem in that inducements, such as incentive, could not be promoted to the consumers in accordance with the changes in the electricity price.

Recently, in order to resolve such problems and to enhance energy efficiency, thorough research on smart grids has actively been in progress. A smart grid refers to a next generation energy system and its management system, which are realized by the combination and fusion of the modernized energy technology and telecommunication technology.

As described above, the current energy network corresponds to a vertical and centered network, which is concentrated at the center and controlled by the supplier (or provider). On the other hand, the smart grid corresponds to a horizontal, cooperative, and distributive network, which is less concentrated to the supplier and which allows the consumer to interact with the supplier. In the smart grid, all electrical devices, power storage devices, and distributed energy are interconnected through a network, thereby enabling the consumer to interact with the supplier. Therefore, the smart grid may also be referred to as the "energy internet".

Meanwhile, in order to be embodied in the position and perspective of the power consumer, such as a home or a building, instead of only receiving one-way energy, the smart grid is required to enable individual electrical devices and multiple electrical devices, which are interconnected via a network, to perform two-way communication with power supply sources in order to exchange energy information. Accordingly, the development of new devices enabling such two-way communication to be performed is also required.

SUMMARY OF THE INVENTION

Accordingly, the present invention is directed to a smart control device that substantially obviates one or more problems due to limitations and disadvantages of the related art.

Another object of the present invention is to provide a smart control device that can be equipped in an electrical appliance (or device), so as to be capable of controlling the electrical appliance by using diverse information that is provided from both the inside and the outside of the electrical appliance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a smart control device monitoring and scheduling operations of an electrical appliance, the smart control device includes an interface unit configured to receive energy information, a smart controller configured to control energy saving functions of the electrical appliance based upon the energy information received from the interface unit, and an input unit configured to receive an inputted control command respective to the electrical appliance. Herein, the smart controller may be provided in the electrical appliance, and the smart controller may control the electrical appliance so that the electrical appliance can be operated in an energy saving operation mode based upon the received energy information.

The smart controller may control the electrical appliance so that the electrical appliance can be operated in the energy saving operation mode based upon the received energy information.

The smart control further includes a display unit configured to display the received energy information and operation status information of the electrical appliance. Herein, the smart controller may perform a control function enabling the received energy information and the operation status information of the electrical appliance to be displayed simultaneously or selectively on the display unit.

The smart controller may take into consideration a change in the status information of the electrical appliance or a change in environment information of the electrical appliance and controls the electrical appliance so that an operation mode respective to the considered factors can be activated.

The smart controller may take into consideration a change in the status information or a change in the environment information so that the electrical appliance can be operated in an energy saving operation mode.

The smart control device further includes a sensor configured to detect the status information or environment information and to detect any change in the status information and the environment information. Herein, the smart controller may perform control functions of recognizing a change in the status information or the environment information, the information being detected by the sensor, responding to the change in the status information or the environment information so as to determine whether or not a change in the current operation mode is required, and, when it is determined that a change in the current operation mode is required, extracting a required operation data value from a memory, so that the changed operation mode with respect to a variation level of the status information or the environment information can be activated.

When a change occurs in the status information, or when a change occurs in the environment information, in order to restrain a change in the status information or to restrain a change in the environment information, the smart controller may perform a control function allowing the operation mode of the electrical appliance to be a negative feedback operation mode.

When a change occurs in the status information, or when a change occurs in the environment information, in order to activate a variation level in the status information or to activate a variation level in the environment information, the smart controller may perform a control function allowing the operation mode of the electrical appliance to be a positive feedback operation mode.

When the energy saving operation mode of the electrical appliance is maintained, the smart controller may control the electrical appliance so that a current operation mode can be maintained, when the variation level of the status information or the environment information is below a first variation reference value, may control the electrical appliance so that the operation mode can be changed in order to restrain a change in the status information or the environment information within a range of the energy saving operation mode, when the variation level of the status information or the environment information is above the first variation reference value and below a second variation reference value, and may control the electrical appliance so that the energy saving operation mode can be cancelled in order to restrain a change in the status information or the environment information, and so that the electrical appliance can be operated in a general operation mode, when the variation level of the status information or the environment information is above the second variation reference value.

The energy information may include information on time-based electricity rates and time period information defined based upon a level of the electricity rate. Herein, the smart controller may control the electrical appliance so that the electrical appliance can be operated in a non-energy saving operation mode during an off peak time period, wherein the electricity rate is below a first standard electricity rate. And, the smart controller may also control the electrical appliance so that the electrical appliance can be operated in a first energy saving operation mode during an on peak time period, wherein the electricity rate is above a first standard electricity rate and below a second standard electricity rate. Furthermore, the smart controller may control the electrical appliance so that the electrical appliance can be operated in a second energy saving operation mode demonstrating a higher energy saving level than the first energy saving operation mode, or so that the operation of the electrical appliance can be stopped, during a critical on peak time period, wherein the electricity rate is above the second standard electricity rate and below a third standard electricity rate.

The energy information may include information on time-based home energy consumption level. Herein, the smart controller may operate the electrical appliance in a non energy saving operation mode during a time period in which the home energy consumption level is below a predetermined standard energy consumption level. And, the smart controller may operate the electrical appliance in an energy saving operation mode in order to restrain or reduce energy consumption during a time period in which the home energy consumption level exceeds the predetermined standard energy consumption level.

The smart controller includes a smart chip being placed inside the electrical appliance.

The interface unit may deliver the received energy information to the smart chip, the smart chip being provided inside the electrical appliance.

The smart control device may be configured of a smart adaptor being connected to a plug of the electrical appliance. Herein, the smart controller may be provided in the inside of the smart adaptor.

The interface unit may be provided in the smart adaptor, so as to be connected to the smart controller. Herein, the interface unit may receive information required for controlling the electrical appliance and may deliver the received information to the smart controller.

The smart adaptor may include at least any one of a display unit configured to display energy information status, and a switch configured to regulate or block energy being supplied to the electrical appliance.

The smart controller may control the electrical appliance so as to independently or simultaneously control operations of multiple energy consuming units provided in the electrical appliance and control power supply for each of the energy consuming units.

The smart controller may control the electrical appliance so that the electrical appliance can be operated in an energy saving operation mode based upon the energy information received by the electrical appliance. And, when a command inputted through the input unit is recognized to have a higher priority level than the energy saving operation mode, the smart controller may control the electrical appliance so that the electrical appliance can be selectively operated either in the operation mode indicated by the recognized command or in the energy saving operation mode.

In another aspect of the present invention, in a smart control device monitoring and scheduling operations of an electrical appliance, the smart control device includes an interface unit configured to receive energy information, a smart controller configured to control energy saving functions of the electrical appliance based upon the energy information received from the interface unit, and an input unit configured to receive an inputted control command respective to the electrical appliance. Herein, the smart controller may control the electrical appliance so that the electrical appliance can be operated in an energy saving operation mode based upon the received energy information. And, when another command respective to the electrical appliance is inputted through the input device, the smart controller may terminate the current operation mode and may control the electrical appliance so that the electrical appliance can be operated according to the inputted command.

The smart controller may perform a step of monitoring whether or not a forced execution operation according to the inputted command is completed. Herein, when the forced execution operation is completed, the smart controller may control the operation of the electrical appliance based upon the information received from the interface unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
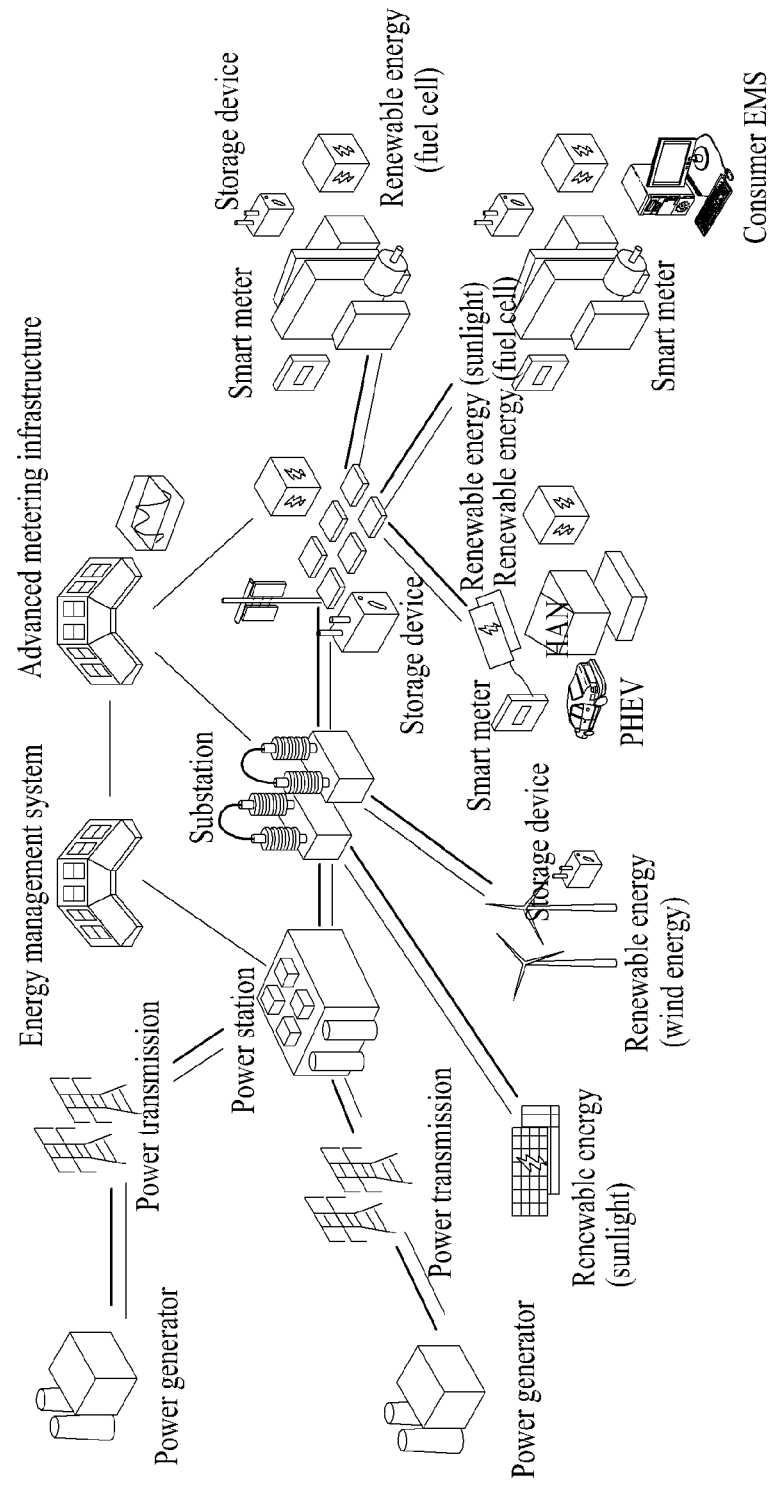
FIG. 1 illustrates a general view of a smart grid that is realized in the present invention.

FIG. 1 illustrates a general view of a smart grid that is realized in the present invention. Herein, a smart grid includes a power generator, which generates power via thermal power generation, nuclear power generation, or hydroelectric power generation, and a solar energy generator and a wind energy generator, which use renewable energy such as solar energy and wind energy.

Also, a thermal power generator, a nuclear power generator, or a hydroelectric power generator sends the generated power to a power station through a transmission line. Then, the power station sends the generated power (or electricity) to substations so that the electricity can be distributed to a party demanding electric power (hereinafter referred to as "demand user"), such as offices or homes.

Additionally, the electricity generated by the renewable energy is also sent to the substations so as to be distributed to each demand user. Thereafter, the electricity being transmitted by the substation passes through a power storage device so as to be distributed to offices or each home (or household).

Accordingly, households or homes using Home Area Networks (HANs) may be capable of self-producing and self-providing (or self-supplying) electricity by using sun light or fuel cells equipped in Plug in Hybrid Electric Vehicles (PHEVs). Moreover, each home may resell surplus (or remaining) electricity to other consumers outside the home.

Furthermore, since offices or homes are provided with smart measuring devices (or smart meters), a user may be capable of tracking the amount of energy used in the respective office or household and the current electricity (or power) rates in real time. Accordingly, based upon this information, the user may recognize the current energy usage status and the respective cost, thereby being able to consider and design a solution for reducing the amount of energy being used or reducing the charged electricity rate.

Meanwhile, since the power generator, the power station, the storage device, and the demand users communicate with one another via two-way communication, apart from the consumer being supplied with one-way electricity, by notifying and informing the status of the demand user to the storage device, the power station, and the power generator, power production (or generation) and power distribution may be regulated and performed in accordance with the notified and informed status of the demand user.

Meanwhile, an Energy Management System (EMS) and an Advanced Metering Infrastructure (AMI) perform the most essential roles in the smart grid. More specifically, the Energy Management System (EMS) performs the functions of real time energy management of the demand user and real time estimation of consumed energy. And, the Advanced Metering Infrastructure (AMI) performs the function of measuring the consumed amount of energy in real time.

Within the smart grid, as a basis technology for integrating the consumers based upon an open architecture, the AMI enables the consumer to use electricity efficiently, and the AMI enables the power supplier to detect any problem or error occurring in the system, so that the power supplier can efficiently operate and manage its system.

Herein, unlike the general communication networks, an open architecture refers to a reference standard enabling all electrical appliances to be connected to one another regardless of the manufacturer (or fabricator) by which the corresponding electrical appliances are manufactured (or fabricated) within the smart grid system.

Accordingly, the AMI that is used in the smart grid allows the concept of consumer-friendly efficiency, such as "Prices to Devices", to be realized. More specifically, a real time price signal of the energy market is relayed via the Energy Management System (EMS) and the smart meter, which are installed in each household. Thereafter, the EMS and the smart meter communicate with each electrical appliance, thereby controlling the corresponding electrical appliances.

The user refers to the EMS or the smart meter so as to be informed of the power (or energy) information of each electrical appliance. Then, by performing power information processing, such as limited settings for the consumed amount of energy or charged electricity rates based upon the informed information, the user may be capable of saving energy and reducing energy cost.

Meanwhile, each electrical appliance is also equipped with a smart control device that can collect (or gather) status information on the operation mode of the respective electrical appliance, receive power information or environment information, such as temperature or humidity, which is sent from the EMS or the smart meter, and reflect the received information to the operation control of the corresponding electrical appliance.

The control of each electrical appliance may be performed by such communication between the smart control device, the Energy Management System (EMS), and the smart meter. Herein, it is preferable that the Energy Management System (EMS) is configured of a local EMS and a central EMS. More specifically, the local EMS is used in offices and homes. And, the central EMS performs a two-way communication with the local EMS and processes the information gathered (or collected) by the local EMS.

Since real time communication on the energy information between the supplier (or provider) and the consumer can be performed in the smart grid, a "real time network response" can be realized. And, accordingly, the high cost that is consumed for meeting with the peak demand may be reduced.

Figure 2:
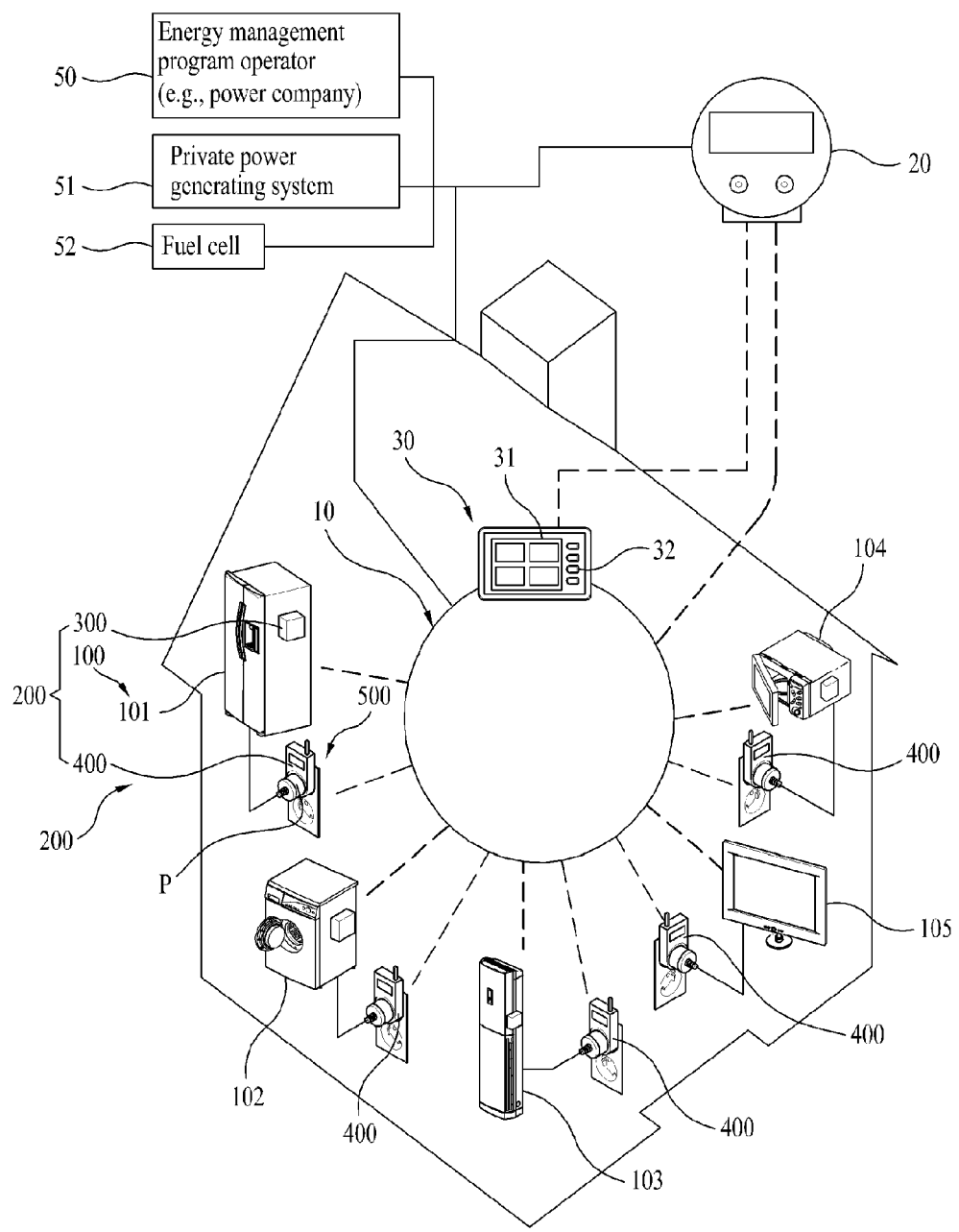
FIG. 2 illustrates a general view of an energy management network that is provided between a power supply source and a home (or household) according to the present invention.

FIG. 2 illustrates a general view of an energy management network 10, which is provided between a power supply source and a home (or household), according to the present invention.

The energy management network 10 is provided with a smart meter 20 and an energy management system (EMS) 30. Herein, the smart meter 20 may receive energy, which is provided to each home, and energy information, such as the charged energy rate (or price), from an outside source and may measure in real time the amount of energy used in the corresponding household and the respective energy price (or cost). And, the energy management system (EMS) 30 is connected to the smart meter 20 and is configured to communicate with at least one or more electrical appliances and to control the operations of the corresponding electrical appliances.

Herein, it is preferable that the energy management system (EMS) 30 is configured in the form of a user equipment that is provided with a display screen 31, which displays the current consumed amount of energy and the current external environment status (i.e., temperature, humidity, etc.), and an input device 32, which can be manipulated by the user.

The EMS 30 is then connected to electrical devices 100, such as a refrigerator 101, a washing machine and drier 102, an air conditioner 103, a television receiver (TV) 105 or a cooking stove (or kitchen stove) 104, through a network within the home, so as to be capable of performing a two-way communication with the connected electrical appliances 100. The communication performed in the home may be performed via wireless communication or via wired communication, such as PLC. Furthermore, it is preferable that each electrical appliance is positioned to be connected with other electrical appliances is a manner to be capable of communicating with one another.

The above-described smart control device 200 is provided either in the inside of or on the outside of each electrical appliance 100 (101 to 105). The smart control device 200 is connected either to the smart meter 20 or to EMS and receives the energy information or environment information from the smart meter 20 or the EMS 30. Then, the smart control device 200 uses the received information to control the electrical appliance 100. The electrical appliance 100 may be controlled by the energy management system (EMS) 30. However, optionally, the electrical appliance 100 may also be controlled by the smart control device 200, which is provided in each electrical appliance 100.

The electric power being supplied to the home may be provided by an energy management program operator 50, such as power companies that are either equipped with a general power generating equipments (e.g., thermal energy, nuclear energy, and water power) or equipped with power generating equipments using renewable energy (e.g., solar energy, wind energy, and geothermal heat). Additionally, electric power may also be provided from other power supply sources, such as private power generating systems 51 that are provided each home (e.g., solar power generator) or fuel cells 52 that are equipped in the house or in cars.

Generally, such power supply sources 50, 51, and 52 are connected to the smart meter 20 and the energy management system (EMS) 30, so as to provide energy information to the smart meter 20 and the EMS 30. Accordingly, the provided energy information is then delivered to each smart control device 200, thereby being used as the basic information for controlling each electric appliance.

However, the information that is provided by the power supply source 50, 51, and 52 may also be directly transmitted to the smart control devices 200 provided in each electric appliance 100 without passing through the smart meter 20 and the energy management system (EMS) 30. Accordingly, information required for controlling the operation of specific electrical appliances within each household may also be directly provided from a power supply source, such as the energy management program operator 50.

The smart control device 200 provided in each electrical appliance 100 may be installed inside the electrical appliance 100. Alternatively, the smart control device 200 may correspond to a mounted smart control device 300, which is installed on the outer surface of the electrical appliance 100 so that the smart control device 200 can be fully or partially exposed.

In addition to the mounted smart control device 300, the smart control device 200 may also be considered to be configured in the form of a smart adaptor 400, which can be inserted to a plug (P) of each electrical appliance 100. The smart adaptor 400 may be inserted in power sockets 500 that are provided in the home, so as to be capable of regulating the amount of electric power (or energy) that is supplied to each electrical appliance 100, or to be capable of directly controlling the operation of an electrical appliance 100 by communicating with the corresponding electrical appliance 100.

Figure 3:
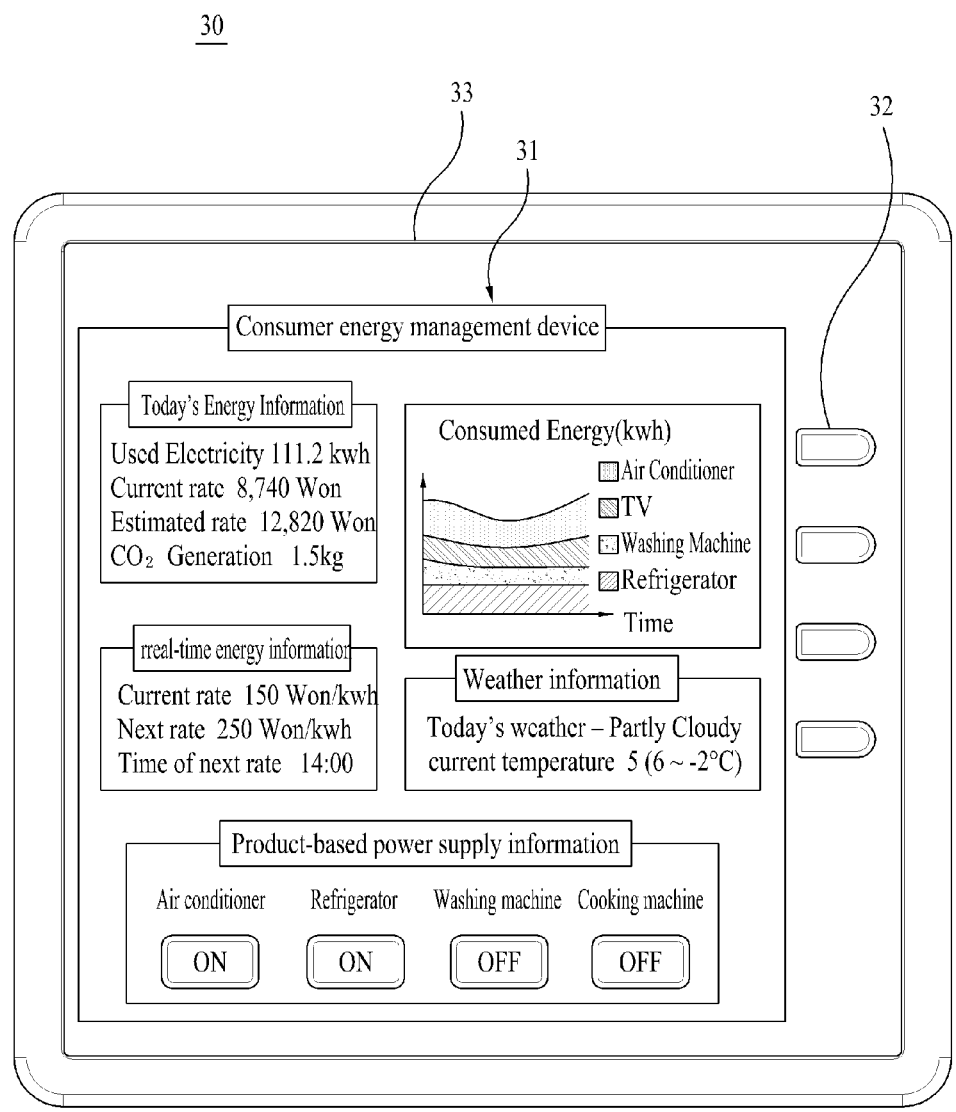
FIG. 3 illustrates a front view of an energy management device according to the present invention.

FIG. 3 illustrates a front view of an energy management device (EMS) according to the present invention. Herein, the EMS is configured to have the form of a user equipment that is equipped with a touch panel 33.

The touch panel 33 displays a display screen 31, which displays information including the current amount of used electricity, the respective charged electricity rate, an estimated electricity rate, which can be estimated based upon the accumulated history of used electricity, and the amount generated amount carbon dioxide ($CO_2$), real time energy information including the electricity rate of the current time period, the electricity rate of the next time period, and the time period during which the electricity rate varies, and also weather information.

The display screen 31 of the touch panel 33 also displays the consumed amount of energy used by each electrical appliance during each time period (or time-based consumed amount of energy) and a graph indicating the change in the consumed amount of energy. Also, information on whether or not energy has been supplied to one or more specific product (or appliance) is also displayed on the display screen 31 in the form of ON/OFF status.

An input unit 32 is provided on one side of the display screen 31. Herein, the user may use the input unit 32 to set up particular operations of an electrical appliance whenever required or needed. By using the input unit 32, the user may set up a specific amount of energy that the user seeks (or intends) to use or may set up a point of limit for the electricity rate. Accordingly, based upon the user settings, the energy management system (EMS) 30 may control the operations of each electrical appliance.

Figure 4:
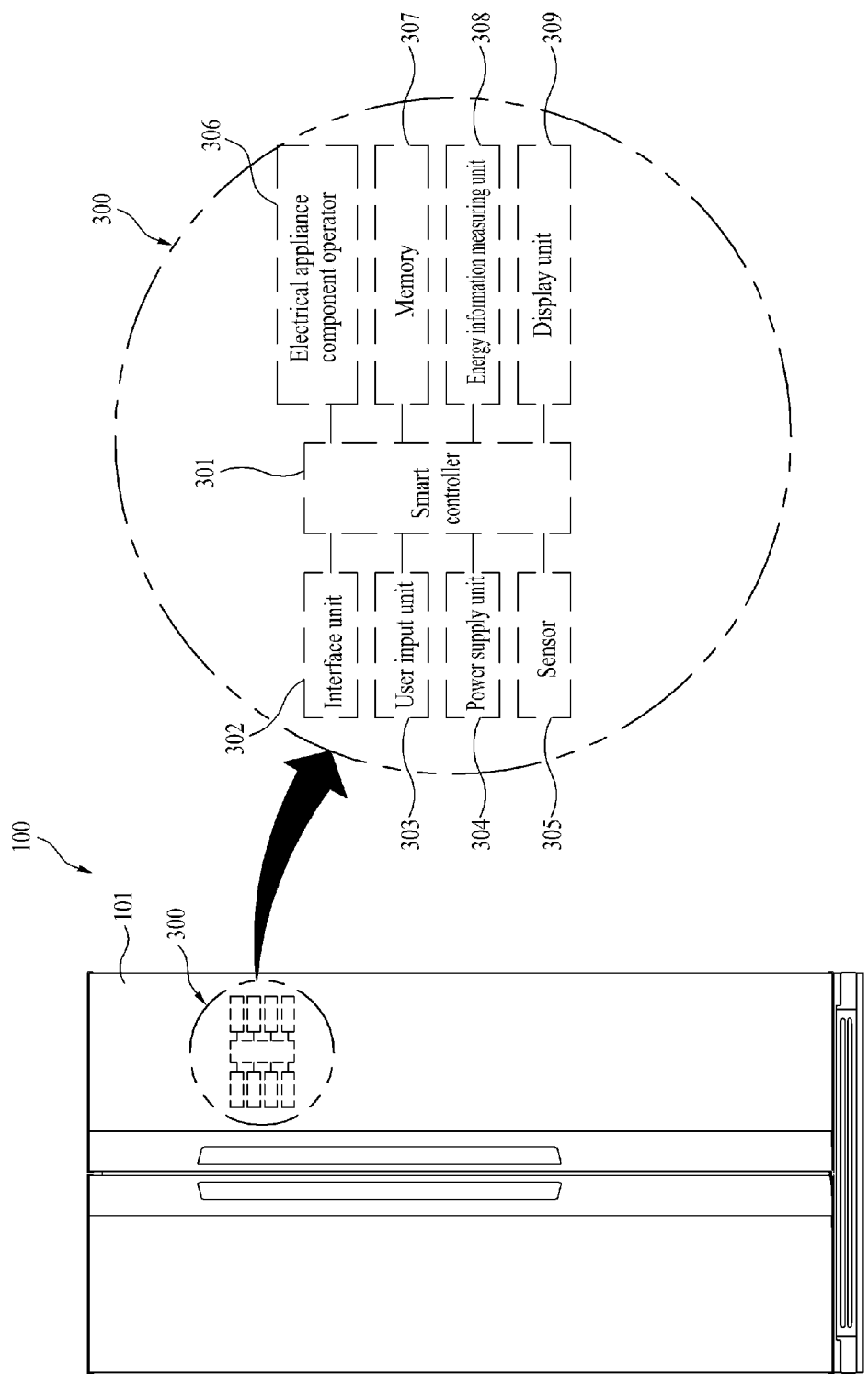
FIG. 4 illustrates a control block view of a mounted smart control device, which is equipped in an electrical appliance, according to the present invention.

FIG. 4 illustrates a control block view of a mounted smart control device, which is equipped in an electrical appliance, according to the present invention. In FIG. 4, a refrigerator 101 is given as an example of the electrical appliance 100 that is equipped with the mounted smart control device 300.

Herein, a smart controller 301 is the essential block within the mounted smart control device 300. In this case, it is preferable that the smart controller 301 is provided in the form of a smart chip. The smart controller 301 is connected to an interface unit 302, an input unit 303, a power supply unit 304, a sensor 305, an electrical appliance component operator 306, a memory 307, an energy information measuring unit 308, a display unit 309, and so on.

The interface unit 302 performs the functions of receiving energy information or environment information that is provided from an outside source and, then, providing the received information to the smart controller 301. The interface unit 302 may be configured of a long range (or distance) communication module or a short range (or distance) communication module. Herein, the long distance communication module may be configured of a module for a wireless/wired internet access.

The wireless internet technology may include a Wireless LAN (WLAN or Wi-Fi), Wireless Broadband (Wibro), World Interoperability for Microwave Access (Wimax), High Speed Downlink Packet Access (HSDPA). Meanwhile, the short range communication technology used in the short range communication module may include Bluetooth, Radio Frequency Identification (RFID), Infrared Data Association (IrDA), Ultra Wideband (UWB), Zigbee, and so on. The long distance (or long range) communication may be used when the mounted smart control device 300 communicates with the power supply source. And, the short range communication may be used when the mounted smart control device 300 communicates with the energy management system (EMS) 30 or the smart meter 20.

Meanwhile, the input unit 303 generates input data that enables the user to control the operation of the mounted smart control device 300. The input unit 303 may include a key pad, a direction key, a dome switch, a touchpad (resistive/capacitive), a jog wheel, a jog switch, and so on.

The display unit 309 is configured to generate an output associated with viewing and hearing (i.e., audio and/or video output). Accordingly, examples of the display unit 309 may include a display module, an audio output module, and so on. The display module displays (or outputs) information that is processed by the mounted smart control device 300.

For example, when information associated to the mounted smart control device 300 and the electrical appliance 100 is displayed, the display unit 309 may display energy information, environment information, status information, and so on, which are associated with the electrical appliance 100, in the form of User Interfaces (UIs) or Graphic User Interfaces (GUIs), such as widgets, icons, and so on.

The above-described display module may include at least one of a liquid crystal display (LCD), a thin film transistor-liquid crystal display (TFT LCD), an organic light-emitting diode (OLED), a flexible display, and a 3-dimensional (3D) display.

When a sensor detecting touch motions (hereinafter referred to as a "touch sensor") is in a mutually layered structure with the display module (hereinafter referred to as a "touchscreen"), in other words, in case of a touchscreen, the display module may be uses as an output device as well as an input device. And, in this case, the input unit 303 may also be provided in the display module. For example, the touch sensor may be configured to have the form of a touch film, a touch sheet, a touchpad, and so on.

The touch sensor may be configured to convert variations occurring on the display module, such as pressure applied to a specific area of the display module or electrostatic capacity generated on a specific area of the display module, to electric input signals. Herein, the touch sensor may also be configured to detect the touched area and the surface area of the touched area as well as the pressure applied to the touched area during the touch motion.

When a touch input is inputted to the touch sensor, one or more signals respective to the inputted touch input is/are sent to a touch controller (not shown). Thereafter, the touch controller processes the at least one or more received signals and transmits the corresponding data to the smart controller 301. Thus, the smart controller 301 may be capable of determining which area of the display module has been touched.

The power supply unit 304 performs the function of supplying energy generated from an outside source to each element (e.g., heater, motor, etc.) of the electrical appliance. The sensor 305 performs the function of sensing the operation status of the electrical appliance 100 or the external or internal temperature, humidity, and so on. Then, the sensor 305 delivers the sensed results to the smart controller 301. Herein, the environment information may be provided from an outside source via the interface unit 302 or may be acquired by the sensor 305 itself.

The electrical appliance component operator 306 refers to a power consuming unit, such as a monitor or a heater, which performs the operations of an electrical appliance. The power consuming unit corresponds to an element operating the components of the electrical appliance 100, such as a fan, a defrost heater, and so on. The power consuming unit is also connected to the smart controller 301 so as to be controlled by the smart controller 301.

The memory 307 stores energy information, such as the charged electricity rate or amount of energy, environment information, or status information respective to the operation of the electrical appliance. Meanwhile, the memory 307 performs the function of storing details on operation parameters that are required for performing the operation mode of each electrical appliance.

Accordingly, when the smart controller 301 selects an operation mode base upon each set of information and performs control operations so that the selected operation mode can be performed, the smart controller 301 reads parameters that are required for such process from the memory 307. Then, by using the read parameters, the smart controller 301 performs the control operations so that the selected operation mode can be performed.

The above-described memory 307 may include at least one type of storage medium among a flash memory type, a hard disk type, a multimedia card micro type, a card type memory (e.g., SD or XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The energy information measuring unit 308 measures the amount of energy that is being supplied to the electrical appliance or measures the corresponding electricity rate in real time. Then, the energy information measuring unit 308 delivers the measured information to the smart controller 301.

Figure 5:
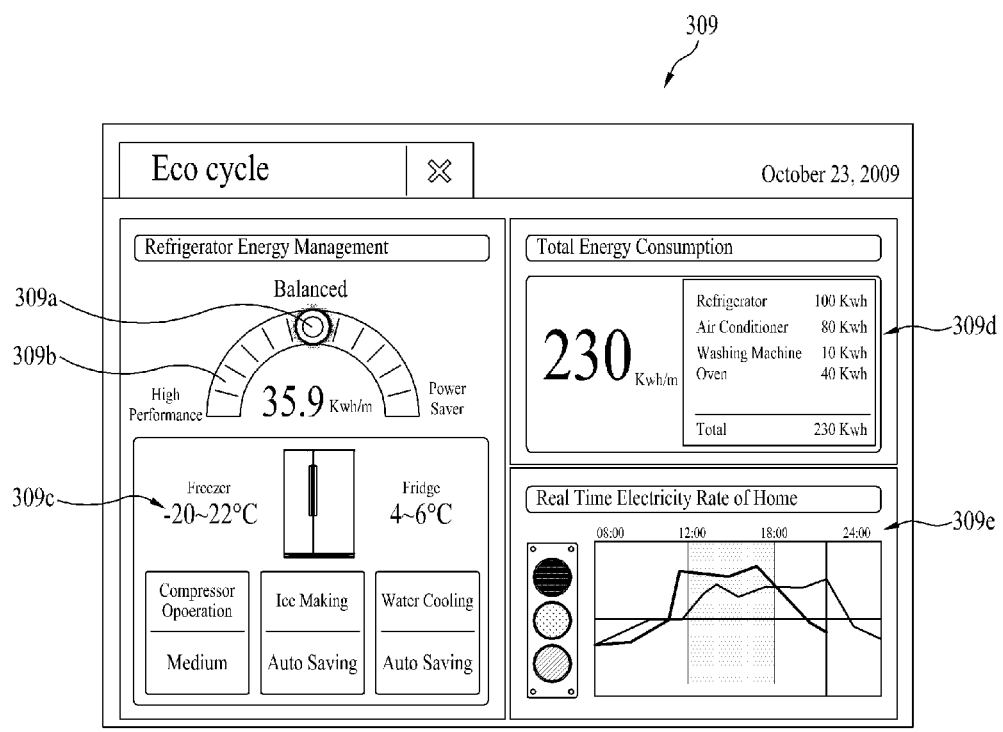
FIG. 5 illustrates a display status of a set of information that is displayed on a display unit according to the present invention.

FIG. 5 illustrates the display unit 309 according to an embodiment of the present invention. It is preferable that the display unit 309 is configured of a predetermined display module, thereby enabling touch input to be performed.

The display unit 309 according to the embodiment of the present invention may display the amount of energy consumed (i.e., energy consumption) by other electrical appliances including that of the refrigerator, the total amount of consumed energy, the respective electricity rates information, and status information indicating the operation status of the refrigerator.

However, the screen configuration of the display unit 309 will not be limited only to the refrigerator. Such display unit 309 may also be applied to other electrical appliances. In the following description, the refrigerator will be given only as an example to simplify and facilitate the description and understanding of the present invention.

Referring to FIG. 5, a draggable control icon 309*a* (i.e., a control icon that can be dragged) is provided on an upper left portion of the display unit 309, so that the operation status of the refrigerator can be adjusted and controlled. The control icon 309*a* is also configured to move along a movement path 309*b*, which is provided to guide the movement of the control icon 309*a*.

One end of the movement path 309*b* indicates a Power Saver mode (i.e., a minimum energy consuming operation mode), and the other end of the movement path 309*b* indicates a High Performance mode (i.e., a maximum energy consuming operation mode). An operation status display window 309*c* indicating temperature levels of each storage compartment within the refrigerator and the operation status of each component is provided below the movement path 309*b*.

An energy information status display window 309*d* is provided on an upper right portion of the display unit 309. Herein, the energy information status display window 309*d* indicates the energy information of the refrigerator and also the energy information of other electrical appliances used in the home. An energy information comparison display window 309*e* comparing the current energy consumption (i.e., consumed amount of energy) in the home or the respective charged electricity rate with other reference energy consumption levels or the corresponding electricity rate.

Figure 6:
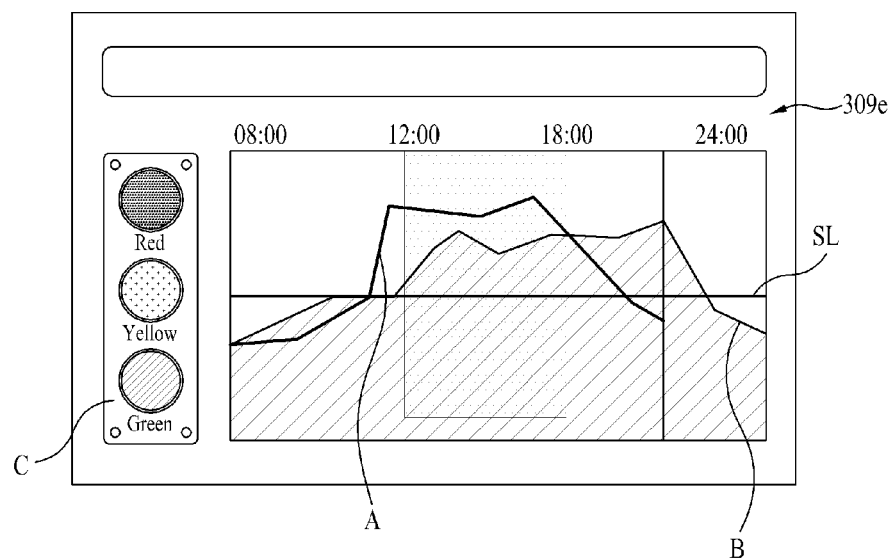
FIG. 6 illustrates a graph indicating power information and an indicator having the form of a traffic light according to the present invention.

As shown in FIG. 6, the energy information comparison display window 309*e* displays a time-based variation graph (A) showing the current energy consumption (i.e., consumed amount of energy) in the home or the respective charged electricity rate, and a time-based graph (B) showing the average energy consumption (i.e., consumed amount of energy) in other homes or the respective charged electricity rate.

Meanwhile, a standard line (SL) for a charged electricity rate or a standard line (SL) for a consumed energy amount is also displayed on the energy information comparison display window 309*e*. Herein, the standard line (SL) may either be set up by the user or be provided by the power company. Accordingly, the time period exceeding the SL may be defined as an ON peak time period, and the time period maintaining below-SL levels may be defined as an OFF peak time period.

A traffic light (A) is provided beside the graphs. Herein, the traffic light (A) is provided with a red display window, a yellow display window, and a green display window. Herein, the displayed color may vary depending upon the charged electricity rate or the energy consumption status. More specifically, the red light may be displayed when the current charging rate for the consumed amount of energy or the current consumed amount of energy exceeds the standard line (SL) or the average level. The yellow light may be displayed when the current charging rate for the consumed amount of energy or the current consumed amount of energy nears (or is about to reach) the standard line (SL) or the average level. And, the green light may be displayed when the current charging rate for the consumed amount of energy or the current consumed amount of energy remains below the standard line (SL) or the average level.

Figure 7:
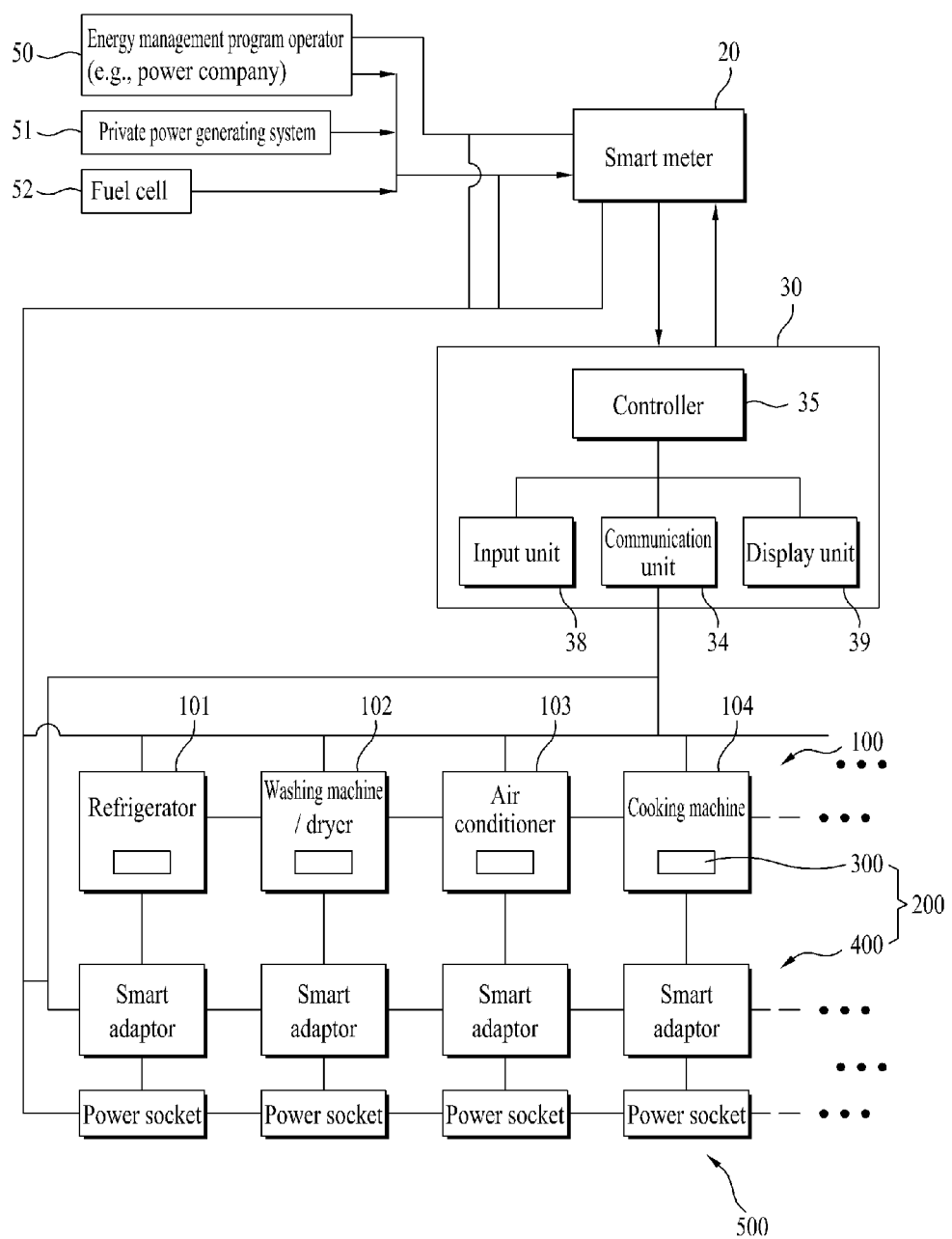
FIG. 7 illustrates a general view of an energy management network that is provided between a power supply source and a home (or household) according to the present invention.

FIG. 7 illustrates a general view of an energy management network that is provided between a power supply source and a home (or household) according to the present invention. More specifically, FIG. 7 illustrates a control block view of a power supply source and an energy management network, which performs the function of supplying power to electrical appliances used in the home, within a smart grid.

As described above, the power supply source may be connected to the smart meter 20 or may be connected to the energy management system (EMS) 30. Optionally, the power supply source may also communicate with a smart control device 200, 300, or 400, which is equipped in the electrical appliance. 100. Herein, referring to the configuration of the energy management system (EMS) 30, the EMS 30 includes a controller 35, an input unit 38, a communication unit 34, and a display unit 39.

The communication unit 34 communicates with the electrical appliances 100 used in the home, such as a refrigerator 101, a washing machine or the drier 102, an air purifier 103, a cooking stove 104, and so on. Herein, the communication unit 34 performs the function of transmitting and receiving energy information and operation information of the electrical appliances 100.

The controller 35 tracks in real time of information including user setting information, which the user has inputted by using the input unit 38, history information indicating an accumulation of the previous operations of the electrical appliance and previous energy usage (or energy consumption), and information on the amount of energy being supplied from an outside source. Thereafter, the controller 35 processes the tracked information in real time, thereby being capable of controlling the operations of the electrical appliances and controlling the power supplied to the corresponding electrical appliances.

As described above, a mounted smart control device 300 may be provided inside each of the electrical appliances 100. Alternatively, instead of the mounted smart control device 300, a smart adaptor 400 being coupled with a plug may also be provided to the electrical appliances 100. The mounted smart control device 300 and the smart adaptor 400 may be connected to the smart meter 20 or the EMS 30, so that the mounted smart control device 300 and the smart adaptor 400 can communicate with the smart meter 20 or the EMS 30. Accordingly, the mounted smart control device 300 and the smart adaptor 400 may be capable of receiving outside information from the smart meter 20 or the EMS 30.

Alternatively, the mounted smart control device 300 and the smart adaptor 400 may also receive outside information via internet communication or energy network communication (or power line communication), without having to communicate with the smart meter 20 or the EMS 30. The smart adaptor 400 is inserted in a power socket 500 provided in the home. And, the lining connected to the power socket 500 is connected to the smart meter 20. Thus, the power supply status of each electrical appliance 100 that is supplied with power through each power socket 500 may be observed and tracked in real time by the smart meter 20.

Meanwhile, it is preferable that the smart adaptors 400 or the mounted smart control devices 300, which are connected to each electrical appliance 100, are connected to one another so that communication between one another can be performed.

Figure 8:
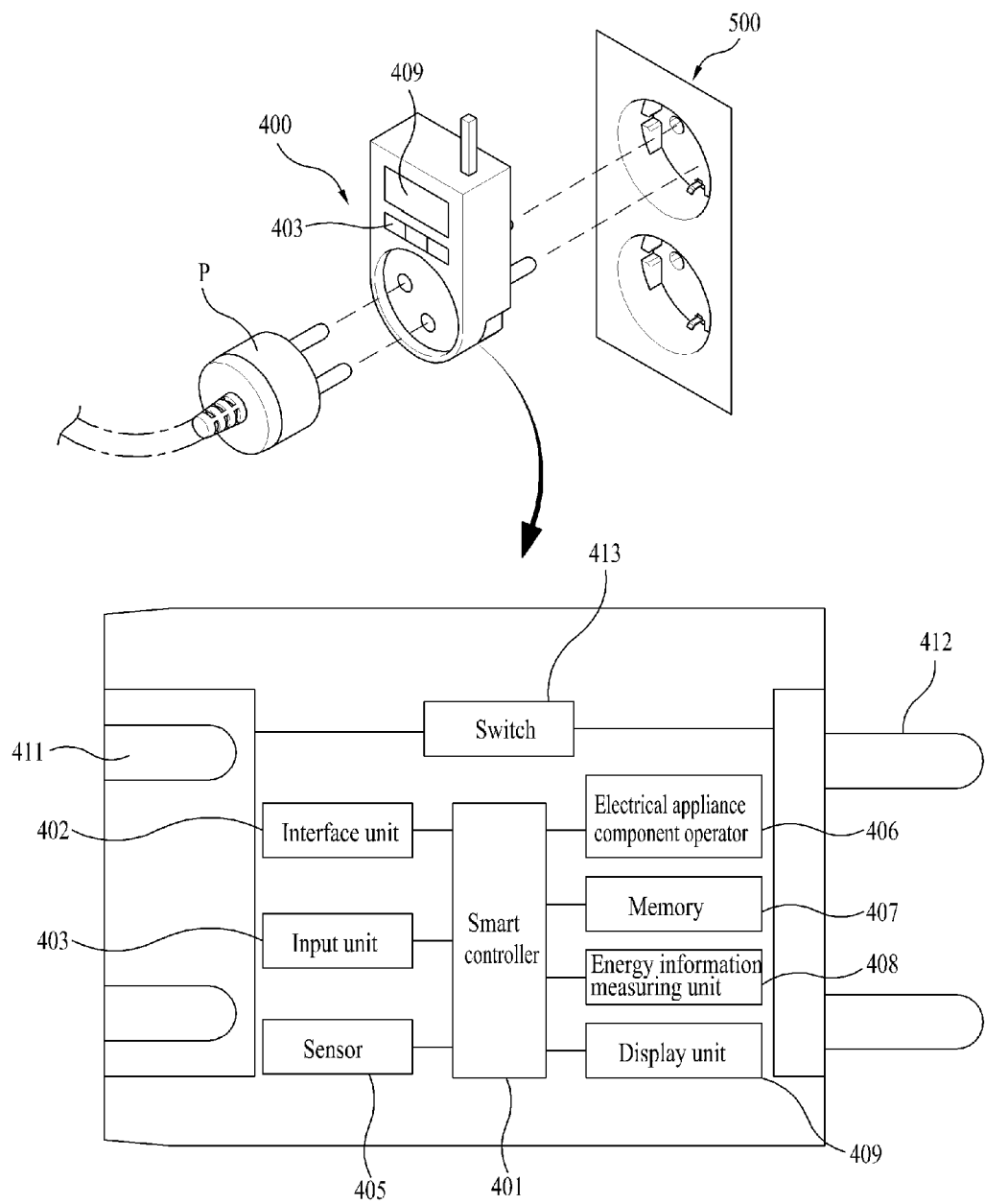
FIG. 8 illustrates a perspective view and a control block view of a smart adaptor according to the present invention.

FIG. 8 illustrates a perspective view and a control block view of a smart adaptor 400 according to the present invention. The smart adaptor 400 is coupled with the plug (P) of an electrical appliance and installed (or inserted) in the power socket 500.

Referring to FIG. 8, the smart adaptor 400 includes a smart controller 401, an interface unit 402, an input unit 403, a sensor 405, a switch operator 406, a memory 407, an energy information measuring unit 408, a display unit 409, a first connection part 411, a second connection part 412, and a switch 413. Herein, the smart controller 401 corresponds to the essential control block. Each of the interface unit 402, the input unit 403, the sensor 405, the switch operator 406, the memory 407, the energy information measuring unit 408, and the display unit 409 is connected to the smart controller 401. The first connection part 411 connects the smart adaptor 400 to the plug (P), and the second connection part 412 connects the smart adaptor 400 to the power socket 500. And, the switch 413 connects the first connection part 411 and the second connection part 412, so as to selectively perform the power supply function.

The smart controller 401 is configured of a micro-processor, thereby being capable of controlling the power supply in accordance with the energy information and environment information, which are provided from an outside source, and the status information of the electrical appliance, or being capable of directly controlling the operation of the electrical appliance by communicating with the corresponding electrical appliance.

The interface unit 402 performs the function of receiving energy information or environment information, which is provided from an outside source, and delivering the received information to the smart controller 401. And, in order to receive the outside information the interface unit 402 may be configured of a long range communication module or a short range communication module. Herein, a long range communication may be used when the smart adaptor 400 communicates with the power supply source, and a short range communication may be used when the smart adaptor 400 communicates with an energy management system (EMS) 30 (ref. FIG. 2) or a smart meter 20 (ref. FIG. 2).

Meanwhile, the input unit 403 generates input data, which enable the user to control the operations of the smart adaptor 400. The input unit 403 may include a key pad, a direction key, a dome switch, a touchpad (resistive/capacitive), a jog wheel, a jog switch, and so on.

The sensor 405 performs the function of sensing the operation status of the electrical appliance 100 or the external or internal temperature, humidity, and so on. Then, the sensor 405 delivers the sensed results to the smart controller 401. Herein, the environment information may be provided from an outside source via the interface unit 402 or may be acquired by the sensor 405 itself.

The switch operator 406 may operate the switch 413 so as to either block or connect the energy flow between the first connection part 411 and the second connection part 412. And, occasionally, the switch operator 406 may regulate and control the amount of supplied energy.

The memory 407 stores energy information, such as the charged electricity rate or amount of energy, environment information, or status information respective to the operation of the electrical appliance. More specifically, when the smart controller 401 selects a predetermined operation mode of an electrical appliance based upon each set of information, and controls the corresponding electrical appliance so that the selected operation mode can be performed, the memory 407 performs the function of storing details on operation parameters that are required for performing the operation mode of each electrical appliance.

In this case, when the smart controller 401 selects an operation mode base upon each set of information and performs control operations so that the selected operation mode can be performed, the smart controller 401 reads parameters that are required for such process from the memory 407. Then, by using the read parameters, the smart controller 401 performs the control operations so that the selected operation mode can be performed.

The energy information measuring unit 408 measures the amount of energy that is being supplied to the electrical appliance or measures the corresponding electricity rate in real time. Then, the energy information measuring unit 408 delivers the measured information to the smart controller 401.

The display unit 409 is configured to generate an output associated with viewing and hearing (i.e., audio and/or video output). Accordingly, examples of the display unit 409 may include a display module, an audio output module, and so on. The display unit 409 may be provided on the external surface of the main body of the smart adaptor 400, so as to be exposed. The display unit 409 may then display diverse information, such as the operation status or energy information of the electrical appliance or the environment information.

Figure 9:
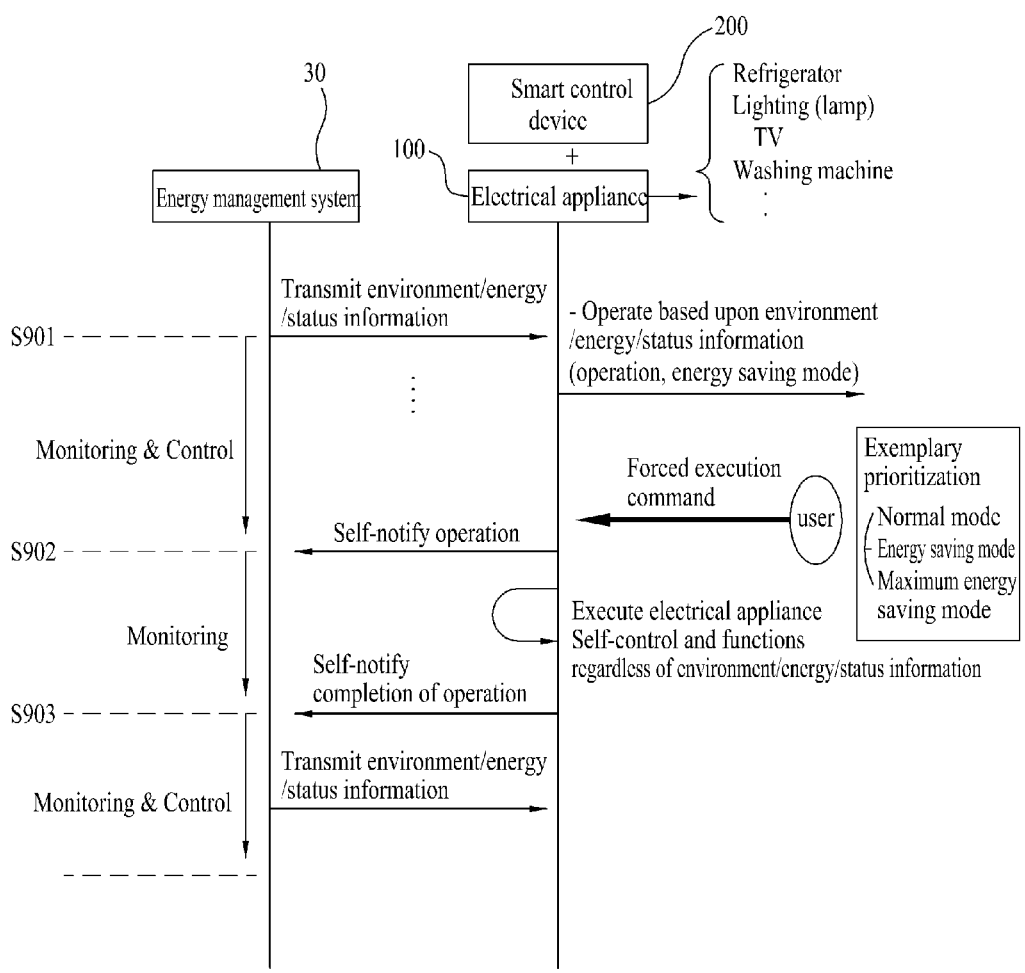
FIG. 9 illustrates a communication status between a smart control device and an energy management device according to the present invention.

FIG. 9 illustrates a communication status between a smart control device 200 and an energy management device 30 according to the present invention.

First of all, if environment information or energy information is transmitted from the energy management system 30 to the smart control device 200, which is mounted on the electrical appliance 100, the smart control device 200 performs a control operation enabling the electrical appliance 100 to be operated in accordance with an overall operation condition considering the environment information, or energy information, or status information of the electrical appliance.

In this case, the smart control device 200 performs the function of controlling the electrical appliance 100 while monitoring the operations of the electrical appliance 100 (S901).

In the meantime, while the electrical appliance 100 is being operated in accordance with the control of the smart control device 200, and when the user abruptly inputs a command directing the electrical appliance 100 to be operated in an operation mode other than the current operation mode, the smart control device 200 performs a step of prioritizing and processing the inputted operation command.

For example, a case of inputting a command for directing the electrical appliance 100 to be operated in an energy saving (or power saver) mode or a maximum energy saving mode from the current normal operation mode, or a case of inputting a command for directing the electrical appliance 100 to be operated in a normal operation mode from the energy saving (or power saver) mode or the maximum energy saving mode may correspond to the above-described process step. Herein, the driving operation is self-controlled by the electrical appliance itself, regardless of the energy information or the environment information, and the respective function may be performed. Furthermore, a case of changing the operation time of the electrical appliance may also correspond to the above-described process step.

When the above-described user input command is prioritized (or scheduled) and performed by force, the corresponding situation is recognized by the smart control device 200, and the corresponding situation is notified to the energy management system (EMS) 30. In this state, the smart control device 200 performs the monitoring step until the control operation is completed (S902).

Subsequently, in case the above-described forced execution operation is completed, the completed situation is recognized by the smart control device 200, and the corresponding situation is notified to the energy management system 30. Thereafter, then the EMS 30 transmits the environment information or energy information to the smart control device 200, and, based upon such information, the smart control device 200 may control and electrical appliance 100, and the respective control situation may be monitored (S903).

However, although the prioritized execution of the user input command may be considered as a mandatory step, the execution of the user input command may also be optionally performed in accordance with the charged electricity rate or the amount of energy consumption. More specifically, even though the user has inputted a command directing the electrical appliance to be operated in a normal operation mode, while the corresponding electrical appliance is being operated in the energy saving operation mode, when it is determined that the electricity rate of the current time period is much more expensive than the rate during a different time period, such information is notified to the user. And, the smart control device 200 may maintain the electrical appliance in the energy saving mode without immediately executing the operation mode directed by the user input, thereby remaining in a stand-by mode.

Figure 10:
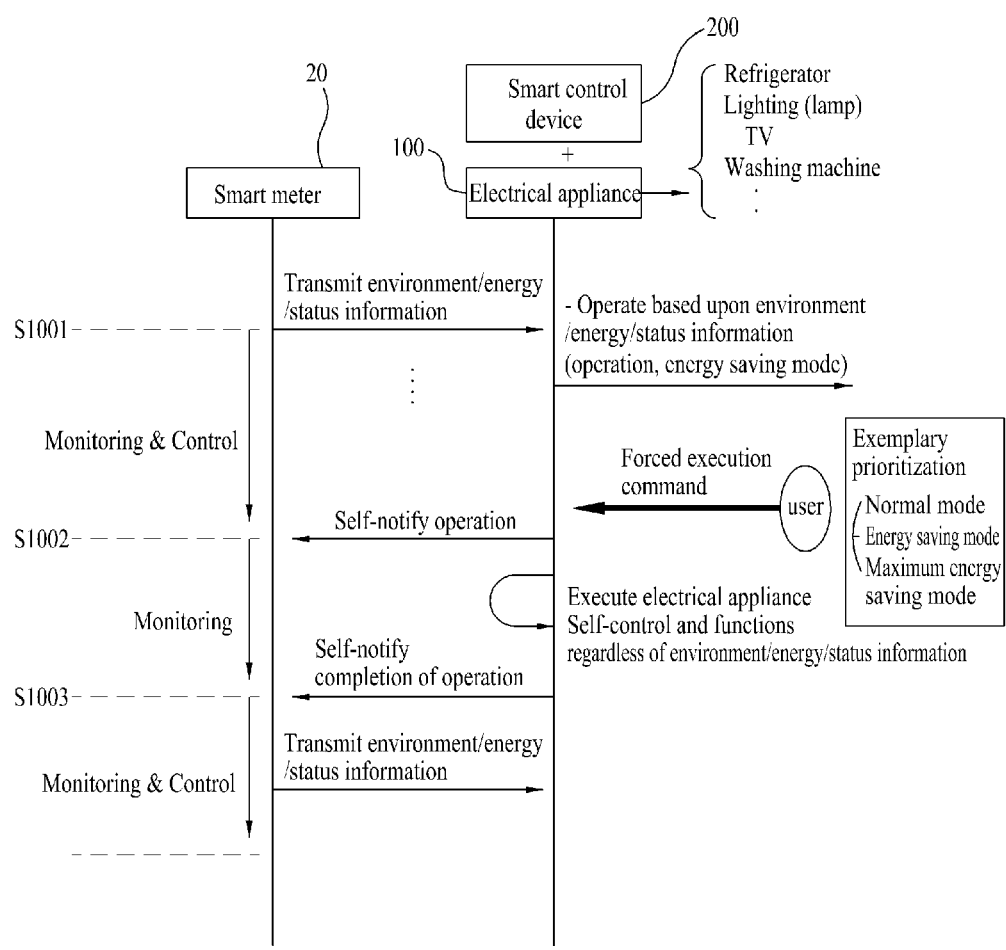
FIG. 10 illustrates a communication status between a smart meter and an energy management device according to the present invention.

FIG. 10 illustrates a communication status between a smart meter 20 and a power management device 200 according to the present invention.

Herein, also, the smart control device 200 generally receives environment information or energy information through the smart meter 20. Then, the smart control device 200 controls the electrical appliance 100 based upon the received information, thereby monitoring the current control situation (S1001 and S1003).

However, in case the user has manually inputted the input command, a step of prioritizing the inputted command and performing the inputted command may exist. During this step, the smart control device 200 only performs the monitoring operation (S1002). And, when such prioritized and forced execution step is completed, the general monitoring and control steps may be performed once again. Since the detailed control situation is identical to that of the situation described in FIG. 9, a detailed description of the same will be omitted for simplicity.

Figure 11:
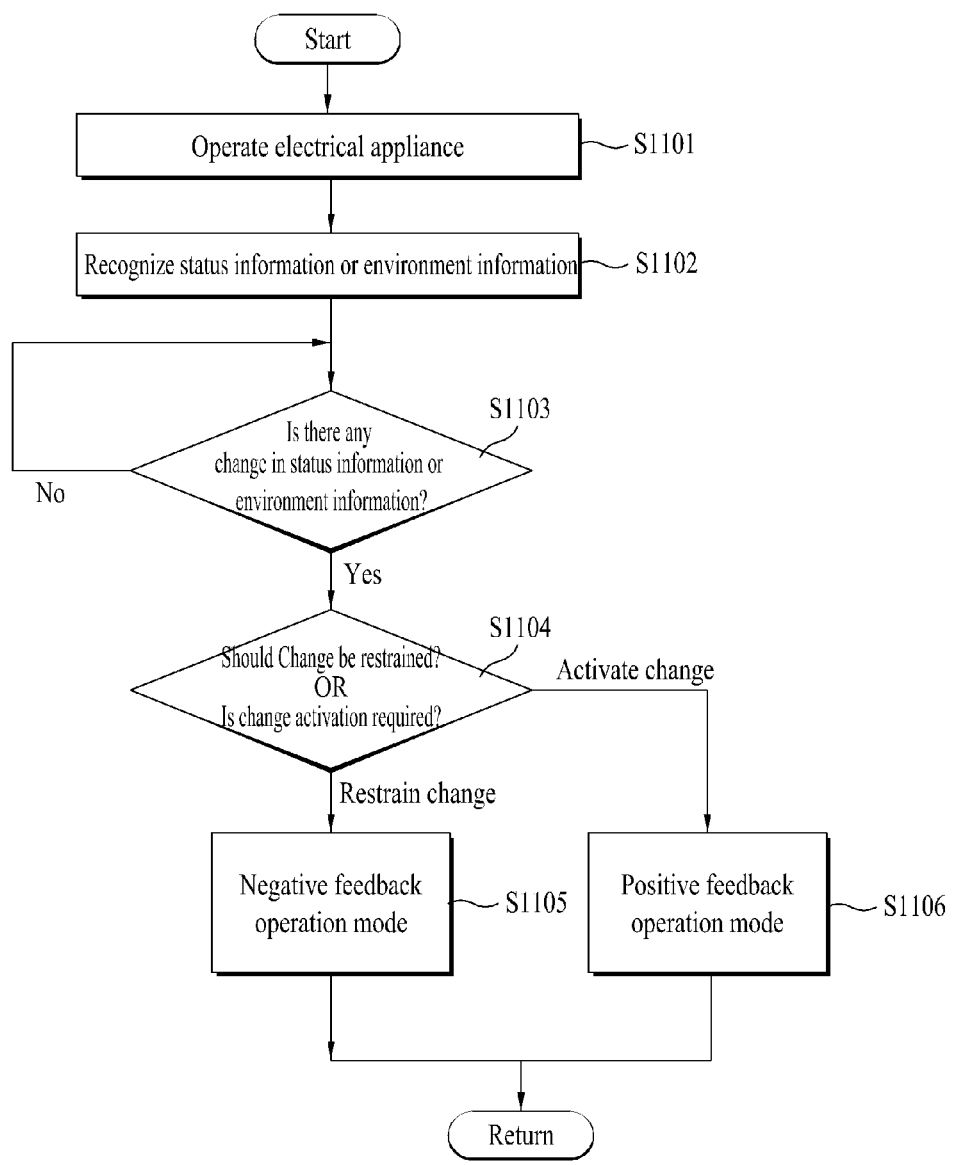
FIG. 11 to FIG. 16 illustrate control flow charts of the smart control device according to the present invention.

FIG. 11 illustrates a flow chart of an electrical appliance control operation of the smart control device based upon the environment information or the status information.

An electrical appliance is operated (S1101), and the smart control device recognizes status information on the operation mode of the electrical appliance or environment information, such as temperature or humidity (S1102). Also, the smart control device determines whether or not a change occurs in the recognized status information or environment information (S1103), and the smart control device also determines whether such change, if any, should be restrained or activated (S1104).

Examples of the status information include the speed of a fan equipped in an air conditioner or an operating (or driving) rate of a compressor, the rotation speed of a drum equipped in a drier, the temperature inside the drum, temperature information of a storage compartment within a refrigerator, and so on. And, examples of the environment information may include indoor temperature or humidity.

More specifically, if the environment information changes to an increase in the indoor temperature, the smart control device may control the electrical appliance so that the electrical appliance can be operated in a Negative feedback operation mode, thereby decreasing the indoor temperature level (S1105). Herein, a negative feedback refers to a feedback control that controls a closed loop system, so as to reduce the influence of the change occurring outside of the closed loop system.

In case of an air conditioner, an increase in the indoor temperature may be prevented, the rotation speed of an indoor fan may be accelerated so that the indoor temperature can be decreased, or the operating rate of the compressor may be increased. Alternatively, in case of a refrigerator, the operating rate of the compressor may be increased, so that an increase in the storage compartment temperature can be prevented, or a stroke of the compressor may be increased.

Meanwhile, in case a change is required to be activated, and more specifically, for example, in case the temperature inside the drum of a drier is required to be further increased, even when the temperature inside of the drum is in an increasing status, in order to accelerate such change, the smart control device may control the electrical appliance so that the electrical appliance can be operated in a Positive feedback operation mode (S1106). Herein, the positive feedback operation mode increases the amount of energy being supplied to the heater, so that the temperature of the heater inside the drier can be increased.

Figure 12:
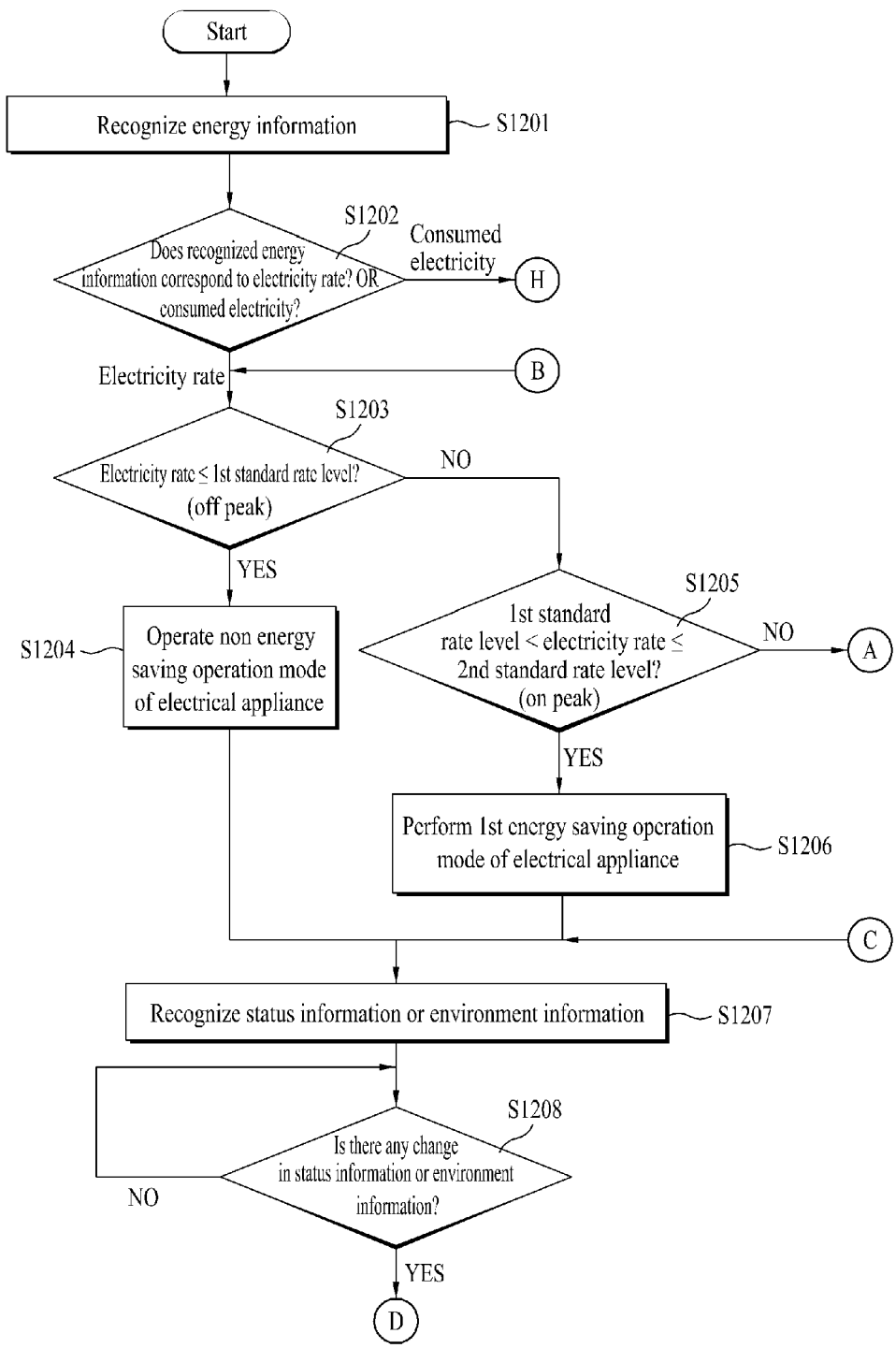

As shown in FIG. 12, the smart control device recognizes the energy information (S1201) and determines whether the recognized energy information corresponds to the charged electricity rate or the amount of energy (S1202). Herein, the recognized charged electricity rate or amount of energy corresponds to the electricity rate respective to the electricity that is currently being used or the amount of consumed energy.

If the recognized information corresponds to the charged electricity rate, the smart control device first determines whether the current electricity rate is below or equal to a first electricity rate reference value, shown in FIG. 17, i.e., whether or not the current electricity rate corresponds to that of an OFF peak time period (or section) (S1203). In case the electrical appliance is currently being operated during an OFF peak time period, the smart control device controls the electrical appliance so that the corresponding electrical appliance can be operated in a non-energy saving operation mode (i.e., the general operation mode) (S1104).

However, if the smart control device determines that the current electricity rate exceeds the first electricity rate reference value, the smart control device then determines whether the current electricity rate is greater than the first electricity rate reference value and less than the second electricity rate reference value. In other words, the smart control device determines whether the electrical appliance is being operated during an ON peak time period (S1205).

When the smart control device determines that the electrical appliance is currently in an on peak status, the smart control device controls the electrical appliance, so that the corresponding electrical appliance can be operated in a first power saving operation mode (S1206). More specifically, in this case, the smart control device reduces the consumed energy of a motor or compressor or lighting (or lamp) provided in the corresponding electrical appliance.

Figure 13:
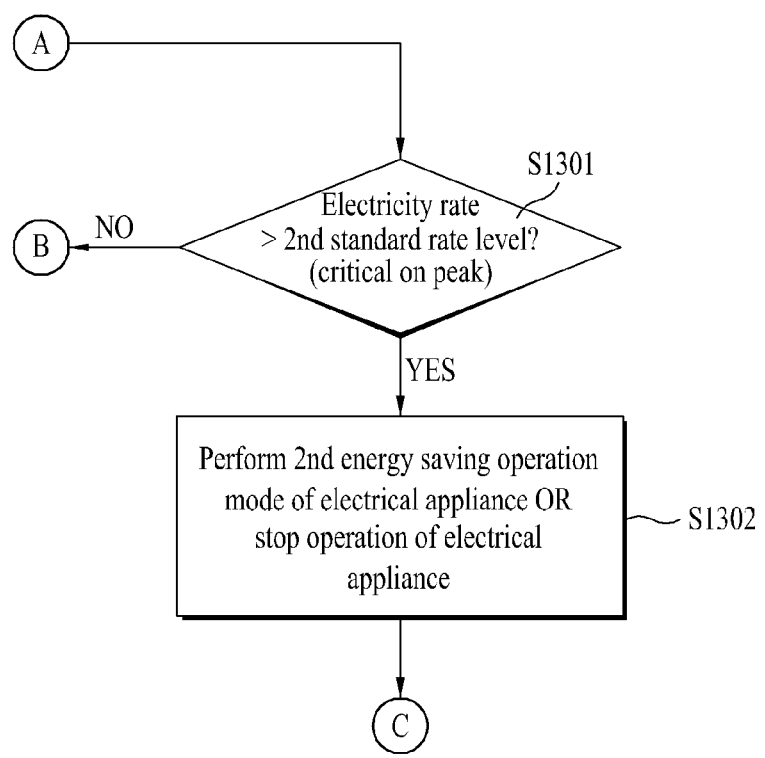
Figure 14:
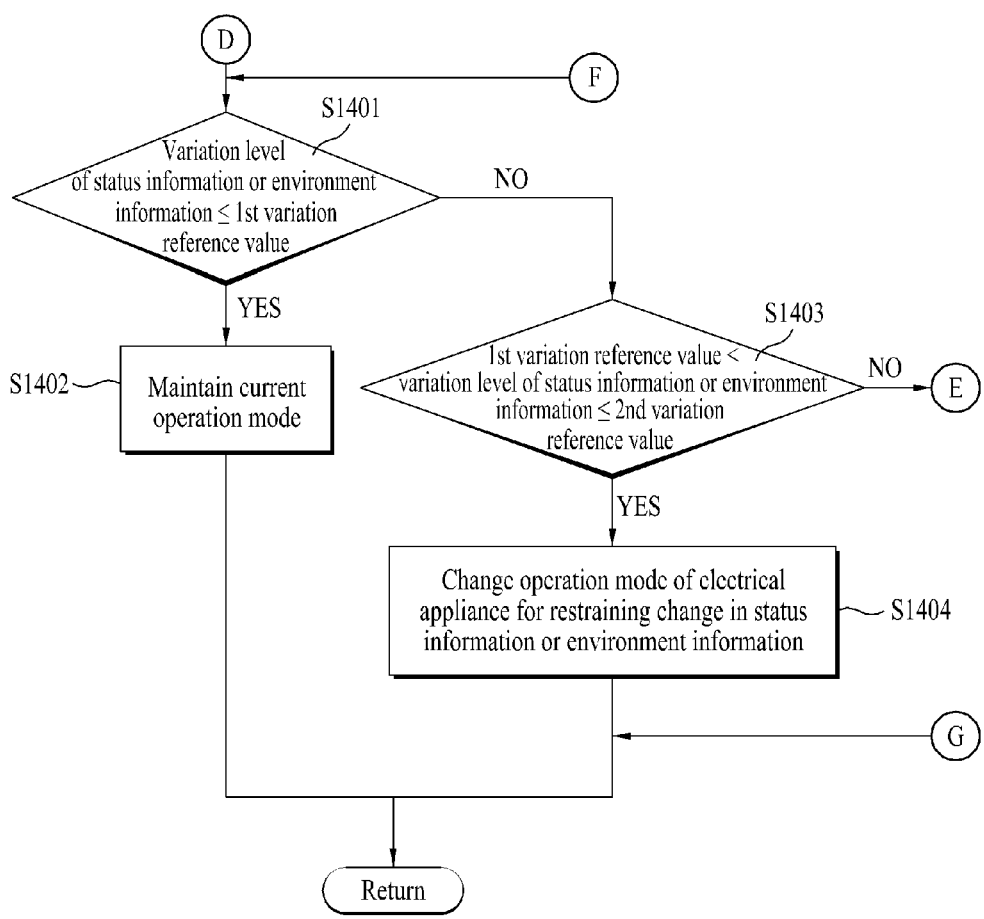
Figure 17:
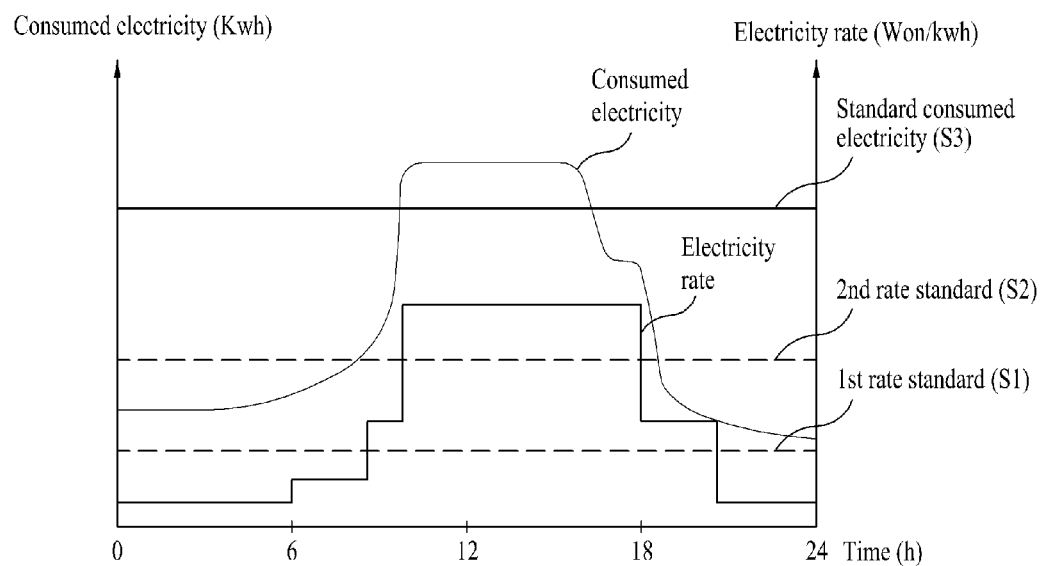
FIG. 17 illustrates a graph indicating an amount of power used during each time period, respective electric power rates, and each reference values according to the present invention.

Meanwhile, if the smart control device determines that the current electricity rate exceeds a second electricity rate reference value, and more specifically, if the smart control device determines that the electrical appliance is being operated during a critical on peak time period, as shown in FIG. 13 and FIG. 17, the smart control device may control the electrical appliance so that the corresponding electrical appliance can be operated in the second energy saving operation mode, which shows a greater power saving intensity as compared to the first energy saving operation mode.

Furthermore, whenever required, the operations of the electrical appliance may be stopped (S1302).

Meanwhile, referring back to FIG. 12, when the electrical appliance is being operated in a non energy saving mode or the first or second energy saving mode, the smart control device monitors the status of the electrical appliance and recognizes the status information of the corresponding electrical appliance or the environment information, such as the outside humidity and the outside temperature (S1207).

Thereafter, the smart control device determines whether or not a change exists in the status information or the environment information, i.e., the smart control device determines whether or not a change exists in the operation status of the corresponding electrical appliance or in the temperature or humidity (S1208). Based upon the determined result, the smart control device determines whether or not the level of change in the status information or the environment information is below or equal to a first variation reference value.

Thereafter, based upon the determined result, if the smart control device determines whether or not the level of change in the status information or the environment information is below or equal to the first variation reference value, the electrical appliance maintains its current operation mode.

More specifically, for example, in case of an air conditioner, when the indoor temperature increases, and if the smart control device determines that the increased temperature level is insignificantly low, this may indicate that the operation status of the current air conditioner is to be maintained.

The smart control device then determines whether or not the variation level in the status information or the environment information exceeds the first variation reference value and whether the variation level is below the second variation reference value (S1403). Then, if the variation level is determined to be greater than the first variation reference value and yet less than the second variation reference value, the smart control device may change the operation mode of the corresponding electrical appliance for restraining the change in the status information or the environment information (S1404).

More specifically, for example, in case the increased indoor temperature level exceeds a predetermined level, or in case the temperature inside a storage compartment of a refrigerator exceeds a predetermined temperature level, the smart control device may change the operation mode of a fan or a compressor, in order to control (or restrain) such change in temperature.

Accordingly, when the non energy saving operation mode is activated, the amount of energy being inputted to each component within the corresponding electrical appliance may be increased, and even when the energy saving operation mode is activated, the inputted amount of energy may be increase within a range that will not influence the energy saving operation mode.

Figure 15:
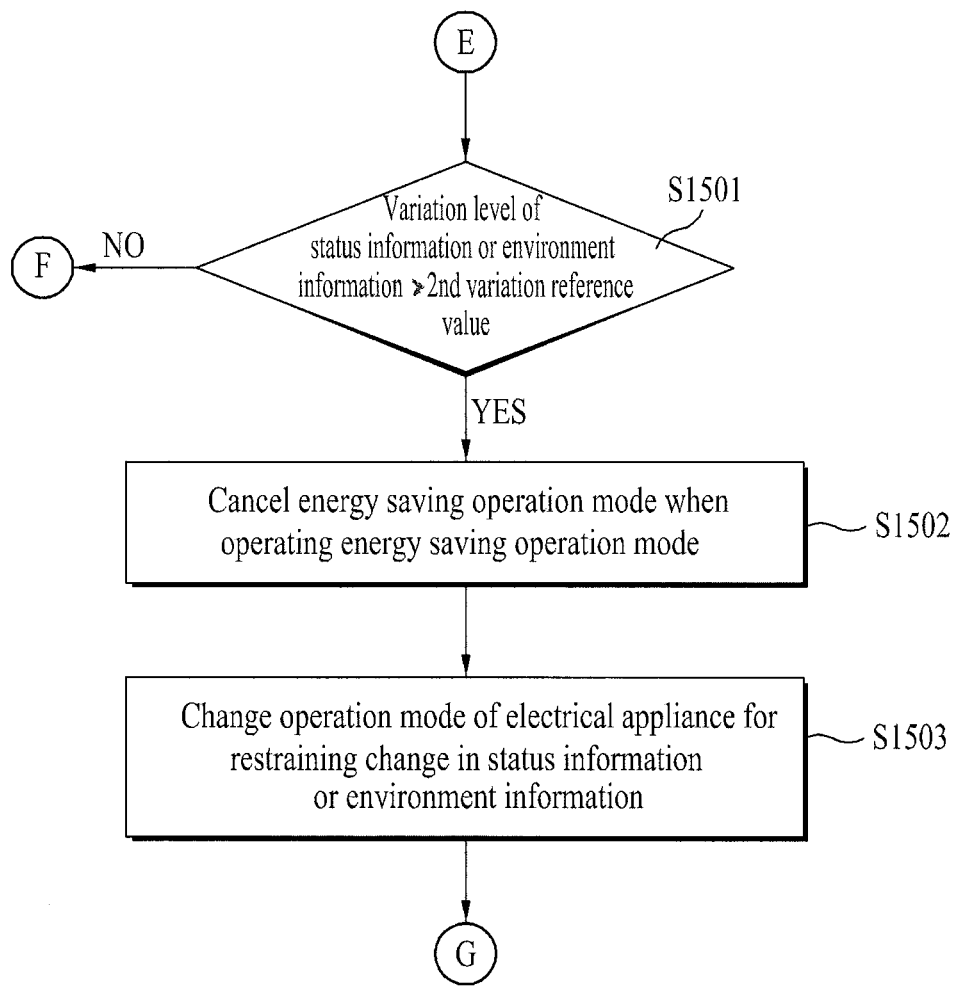

As shown in FIG. 15, when the smart control device determines that the variation level in the status information or the environment information exceeds the second variation reference value (S1501), the smart control device may control the electrical appliance so that the variation level can be regulated. However, in this case, the amount of energy used for regulating the variation level may be greater than that of step S1404.

Most particularly, when the electrical appliance is being operated in the energy saving operation mode, the smart control device may deactivate the energy saving operation mode so as to allow the inevitable usage of energy (S1502). Thereafter, in order to regulate the change in the status information or the environment information, the smart control device performs a control function so as to change the operation mode of the corresponding electrical appliance (S1503).

As described above, the variation range in the operation mode of step S1503 will become evidently larger than the variation range in the operation mode shown in step S1404.

Figure 16:
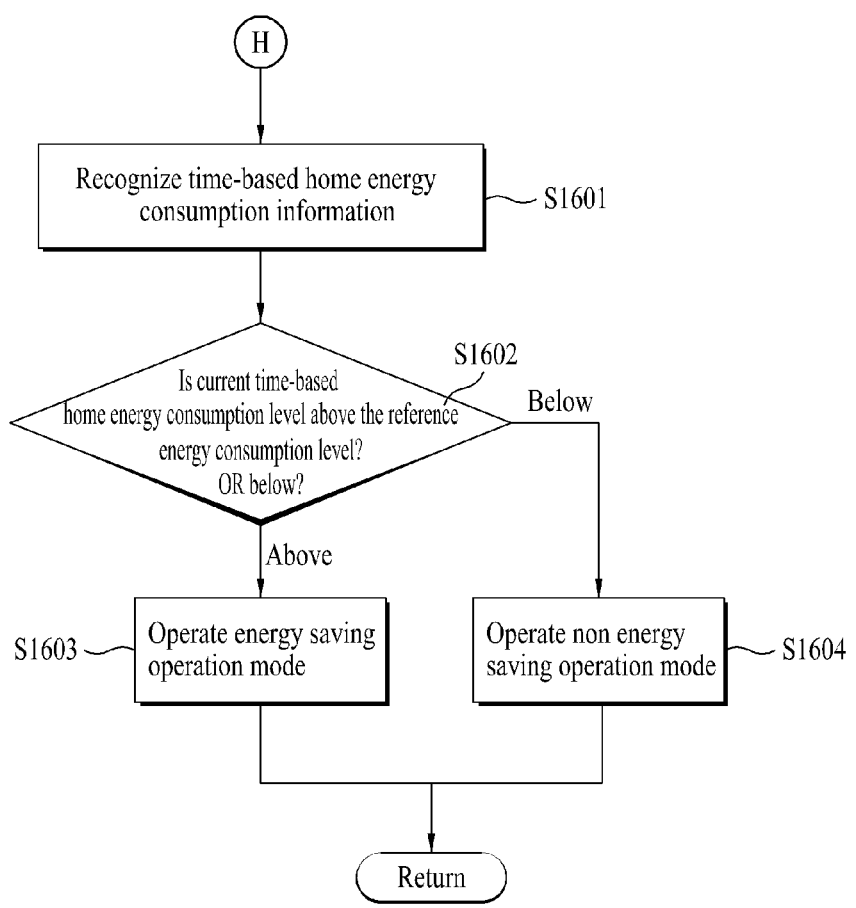

Meanwhile, in case the information recognized in step S1202 of FIG. 12 corresponds to the used amount of energy, the smart control device recognizes a current time-based home energy consumption level (or consumed amount of energy) information (S1601), as shown in FIG. 16. And, then, the smart control device determines whether the current home energy consumption level exceeds a standard energy consumption level or whether the current home energy consumption level is less than or equal to the standard energy consumption level (S1602).

More specifically, referring to the graph shown in FIG. 17, the smart control device determines whether the energy consumption level (or consumed amount of energy) exceeds the standard energy consumption level (S3). Then, when it is determined that the current energy consumption level exceeds the standard energy consumption level (S3), the smart control device recognizes the current time period as the on peak time period. Accordingly, during this time period, the smart control device performs a control operation that allows multiple electrical appliances to be simultaneously or selectively activated in the energy saving operation mode in order to reduce the energy consumption level (S1603).

Conversely, if the smart control device determines that the current energy consumption level is below the standard energy consumption level (S3), the smart control device then recognizes the corresponding time period as an off peak time period, thereby operating the electrical appliance in the non energy saving operation mode (S1604).

Herein, reference to the energy consumption level shown in FIG. 16 to recognize the on peak time period or off peak time period corresponds to the reference to a limited energy consumption level, which is decided by each home. Therefore, each household may differently set up the on peak time period and the off peak time period.

As described above, the smart control device according to the present invention has the following advantages. Instead of having an electrical appliance controlled by a simple input command, by providing a smart control device that can control electrical appliances in accordance with diverse information that is provided from the corresponding electrical appliance or from a source outside of the electrical appliance, the electrical appliances may be operated more efficiently.

Most particularly, by controlling the electrical appliances while taking into consideration the energy information, such as the charged electricity rate or the consumed amount of energy (or energy consumption level), the environment information, such as humidity and temperature, and the operation status information of the corresponding electrical appliance, the electrical appliances may be used and managed more economically.

Meanwhile, in case the smart control device is provided in the form of a smart adaptor, since a flexible operation control is available in accordance with various types of information on the related art electrical appliances, which does not include a smart controller. Thus, a larger number of consumers may be easily connected a smart grid program.

Additionally, the smart control device is embedded in the electrical appliance or mounted on the outer surface of the electrical appliance, and such mounted smart control devices may be configured to communicate with one another. Thus, an energy management network may be established inside the home.

Furthermore, in case a type of server or energy management system, which controls the electrical appliances from a higher-level layer of each electrical appliance, exists or does not exist, each electrical appliance may activate an efficient and economic operation mode based upon the energy information, or environment information, or status information, which is provided by each electrical appliance.

When activating the operation mode of the electrical appliance in accordance with diverse information, an when a different operation command is abruptly inputted by the user, by prioritizing the inputted operation command and by processing the prioritized operation command, the selectivity and convenience of the user may be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A smart control device for monitoring and scheduling operations of an electrical appliance, the smart control device comprising:
an interface unit configured to receive energy information;
a sensor unit configured to detect at least one of status information of the electrical appliance and environment information of the electrical appliance;
a smart controller provided in the electrical appliance and configured to control an operation mode of the electrical appliance based upon at least one of the energy information, the status information and the environment information; and
an input unit configured to input a user's control command respective to the electrical appliance,
wherein the smart controller determines an absolute value for at least one of a variation of the status information or a variation of the environment information from a previously detected status information or environment information from the operation mode and controls the operation mode of the electrical appliance corresponding to at least one of the variation of the status information or variation of the environment information, wherein, when the received energy information is on peak time period and the operation mode is a first energy saving operation mode, the smart controller is configured to:
control the electrical appliance so that the operation mode can be maintained as the first energy saving operation mode, when the absolute value of the variation of the status information or the environment information is below a first variation reference value,
control the electrical appliance so that the operation mode can be changed from the first energy saving operation mode into a second energy saving operation mode in order to restrain the variation of the status information or the environment information within a range of the energy saving operation mode, when the absolute value of the variation of the status information or the environment information is between the first variation reference value and a second variation reference value, and
control the electrical appliance so that the operation mode can be changed from the second energy saving operation mode into a general operation mode in order to restrain a variation of the status information or the environment information, when the absolute value of the variation of the status information or the environment information is above the second variation reference value, and
wherein an amount of energy for operating the second energy saving operation mode is greater than an amount of energy for operating the first energy saving operation mode, and the amount of energy for operating the second energy saving operation mode is smaller than an amount of energy for operating the general operation mode.

2. The smart control device of claim 1, wherein, when another command respective to the electrical appliance is inputted through the input device, the smart controller terminates a current operation mode and controls the electrical appliance so that the electrical appliance is capable of being operated according to the inputted command.

3. The smart control device of claim 1, further comprising:
a display unit configured to display the received energy information and the status information of the electrical appliance, and
wherein the smart controller performs a control function enabling the received energy information and the status information of the electrical appliance to be displayed simultaneously or selectively on the display unit.

4. The smart control device of claim 1, wherein the smart controller performs control functions of:
determining whether or not a change of the operation mode is required so as to respond to the variation of the status information or the environment information; and
when it is determined that a change in the current operation mode is required,
extracting a required operation data value from a memory, the required operation data related to the change of the operation mode which reflect a variation of the status information or the environment information, and changing the operation mode.

5. The smart control device of claim 1, wherein, when a variation occurs in the status information, or when a variation occurs in the environment information, in order to restrain a change in the status information or to restrain a change in the environment information, the smart controller performs a control function allowing the operation mode of the electrical appliance to be a negative feedback operation mode.

6. The smart control device of claim 1, wherein, when a variation occurs in the status information, or when a variation occurs in the environment information, in order to activate a variation in the status information or to activate a variation in the environment information, the smart controller performs a control function allowing the operation mode of the electrical appliance to be a positive feedback operation mode.

7. The smart control device of claim 1, wherein the energy information includes information on time-based electricity rates and time period information defined based upon a level of the electricity rate,
wherein the smart controller controls the electrical appliance so that the electrical appliance can be operated in a non-energy saving operation mode during an off peak time period, wherein the electricity rate is below a first standard electricity rate,
wherein the smart controller controls the electrical appliance so that the electrical appliance can be operated in a third energy saving operation mode during an on peak time period, wherein the electricity rate is above a first standard electricity rate and below a second standard electricity rate, and
wherein the smart controller controls the electrical appliance so that the electrical appliance can be operated in a fourth energy saving operation mode demonstrating a higher energy saving level than the third energy saving operation mode, or so that the operation of the electrical appliance can be stopped, during a critical on peak time period, wherein the electricity rate is above the second standard electricity rate and below a third standard electricity rate.

8. The smart control device of claim 1, wherein the energy information includes information on time-based home energy consumption level, and wherein the smart controller operates the electrical appliance in a non energy saving operation mode during a time period in which the home energy consumption level is below a predetermined standard energy consumption level, and wherein the smart controller operates the electrical appliance in an energy saving operation mode in order to restrain or reduce energy consumption during a time period in which the home energy consumption level exceeds the predetermined standard energy consumption level.

9. The smart control device of claim 1, wherein the smart controller comprises a smart chip being placed inside the electrical appliance.

10. The smart control device of claim 9, wherein the interface unit delivers the received energy information to the smart chip, the smart chip being provided inside the electrical appliance.

11. The smart control device of claim 1, wherein the smart control device is configured of a smart adaptor being connected to a plug of the electrical appliance, and wherein the smart controller is provided in the inside of the smart adaptor.

12. The smart control device of claim 11, wherein the interface unit is provided in the smart adaptor, so as to be connected to the smart controller, and wherein the interface unit receives information required for controlling the electrical appliance and delivers the received information to the smart controller.

13. The smart control device of claim 12, wherein the smart adaptor comprises at least any one of:
a display unit configured to display energy information status; and
a switch configured to regulate or block energy being supplied to the electrical appliance.

14. The smart control device of claim 1, wherein the smart controller controls the electrical appliance so as to independently or simultaneously control operations of multiple energy consuming units provided in the electrical appliance and control power supply for each of the energy consuming units.

15. The smart control device of claim 1, wherein the smart controller controls the electrical appliance so that the electrical appliance can be operated in an energy saving operation mode based upon the energy information received by the electrical appliance, and wherein, when a command inputted through the input unit is recognized to have a higher priority level than the energy saving operation mode, the smart controller controls the electrical appliance so that the electrical appliance can be selectively operated either in the operation mode indicated by the recognized command or in the energy saving operation mode.

16. A smart control device for monitoring and scheduling operations of an electrical appliance, the smart control device comprising:
an interface unit configured to receive energy information;
a sensor unit configured to detect at least one of status information of the electrical appliance and environment information of the electrical appliance;
a smart controller provided in the electrical appliance and configured to control an operation mode of the electrical appliance based upon at least one of the energy information, the status information and the environment information; and
an input unit configured to input a user's control command respective to the electrical appliance, wherein, when another command respective to the electrical appliance is inputted through the input device, the smart controller terminates a current operation mode and controls the electrical appliance so that the electrical appliance is capable of being operated according to the inputted command, wherein the smart controller determines an absolute value for at least one of a variation of the status information or a variation of the environment information from a previously detected status information or environment information from the operation mode and controls the operation mode of the electrical appliance corresponding to at least one of the variation of the status information or variation of the environment information, wherein, when the received energy information is on peak time period and the operation mode is a first energy saving operation mode, the smart controller is configured to:
control the electrical appliance so that the operation mode can be maintained as the first energy saving operation mode, when the absolute value of the variation of the status information or the environment information is below a first variation reference value,
control the electrical appliance so that the operation mode can be changed from the first energy saving operation mode into a second energy saving operation mode in order to restrain the variation of the status information or the environment information within a range of the energy saving operation mode, when the absolute value of the variation of the status information or the environment information is between the first variation reference value and a second variation reference value, and
control the electrical appliance so that the operation mode can be changed from the second energy saving operation mode into a general operation mode in order to restrain a variation of the status information or the environment information, when the absolute value of the variation of the status information or the environment information is above the second variation reference value, and wherein an amount of energy for operating the second energy saving operation mode is greater than an amount of energy for operating the first energy saving operation mode, and the amount of energy for operating the second energy saving operation mode is smaller than an amount of energy for operating the general operation mode.

17. The smart control device of claim 16, wherein the smart controller performs a step of monitoring whether or not a forced execution operation according to the inputted command is completed, and wherein, when the forced execution operation is completed, the smart controller controls the operation of the electrical appliance based upon the information received from the interface unit.

* * * * *